United States Patent
Tsuzuki et al.

(10) Patent No.: US 7,761,437 B2
(45) Date of Patent: Jul. 20, 2010

(54) NAMED ENTITY EXTRACTING APPARATUS, METHOD, AND PROGRAM

(75) Inventors: Takashi Tsuzuki, Osaka (JP); Yoshiyuki Okimoto, Nara (JP); Kenji Mizutani, Nara (JP); Satoshi Matsuura, Kyoto (JP); Tsuyoshi Inoue, Nara (JP); Hiroshi Kutsumi, Osaka (JP)

(73) Assignee: Panasonic Corporation, Osaka (JP)

( * ) Notice: Subject to any disclaimer, the term of this patent is extended or adjusted under 35 U.S.C. 154(b) by 77 days.

(21) Appl. No.: 11/916,222

(22) PCT Filed: Dec. 26, 2005

(86) PCT No.: PCT/JP2005/023768

§ 371 (c)(1),
(2), (4) Date: Nov. 30, 2007

(87) PCT Pub. No.: WO2006/134682

PCT Pub. Date: Dec. 21, 2006

(65) Prior Publication Data

US 2009/0119274 A1    May 7, 2009

(30) Foreign Application Priority Data

Jun. 15, 2005   (JP) .............................. 2005-175678

(51) Int. Cl.
*G06F 7/00* (2006.01)
(52) U.S. Cl. ...................................... 707/705
(58) Field of Classification Search ...................... 707/2
See application file for complete search history.

(56) References Cited

U.S. PATENT DOCUMENTS 7,143,091 B2 * 11/2006 Charnock et al. ............... 707/5

2003/0130835 A1   7/2003 Azzam et al.
2005/0216443 A1 *  9/2005 Morton et al. ................. 707/3

FOREIGN PATENT DOCUMENTS

JP       6-052221     2/1994

(Continued)

OTHER PUBLICATIONS

International Search Report issued Feb. 14, 2006 in the International (PCT) Application of which the present application is the U.S. National Stage.

*Primary Examiner*—Charles Rones
*Assistant Examiner*—Fazlul Quader
(74) *Attorney, Agent, or Firm*—Wenderoth, Lind & Ponack, L.L.P.

(57) ABSTRACT

A named entity extracting apparatus that extracts a named entity suitable for a user by enabling an order to be set in which the named entity is extracted from texts includes: an extraction order reading unit 103 that acquires a named entity pattern name stored in association with an extraction order in an extraction order storage unit 102; a named entity extracting unit 105 that extracts the named entity from input texts using a named entity pattern corresponding to the named entity pattern name acquired by the extraction order reading unit 103; and an extraction end judging unit 106 which outputs, in the case where extraction has not ended, a text on which the extraction is in progress to the extraction order reading unit 103, and continues the named entity extraction processing.

7 Claims, 30 Drawing Sheets

FOREIGN PATENT DOCUMENTS

| | | |
|---|---|---|
| JP | 10-283355 | 10/1998 |
| JP | 2001-134600 | 5/2001 |
| JP | 2002-334076 | 11/2002 |
| JP | 2003-99454 | 4/2003 |
| JP | 2003-248680 | 9/2003 |
| JP | 2004-046775 | 2/2004 |
| JP | 2004-46775 | 2/2004 |
| JP | 2004-86534 | 3/2004 |
| JP | 2004-312627 | 11/2004 |

* cited by examiner

FIG. 2

| Extraction order total number | 3 |
|---|---|
| Extraction order | Named entity pattern name |
| 1 | Named entity pattern A |
| 2 | Named entity pattern B |
| 3 | Named entity pattern C |
| : | : |

FIG. 3

| Personal name |
|---|
| 続木貴史 |
| 松下太郎 |
| 松下次郎 |
| : |

FIG. 4

| | Personal name | |
|---|---|---|
| Pattern ID | Previous character string | Subsequent character string |
| 1 | ］ | 、 |
| 2 | ） | 、 |
| 3 | 、 | 、 |
| ⋮ | ⋮ | ⋮ |

FIG. 5

| Personal name | | | |
|---|---|---|---|
| Previous character string | Probability value | Subsequent character string | Probability value |
| ］ | 0.9 | 、 | 0.2 |
| ） | 0.5 | 。 | 0.0 |
| 、 | 0.3 | 様 | 0.8 |
| ⋮ | | ⋮ | |

FIG. 9

| User identifier | 01 |
|---|---|
| Extraction order total number | 3 |
| Extraction order | Named entity pattern name |
| 1 | Named entity pattern A |
| 2 | Named entity pattern B |
| 3 | Named entity pattern C |
| : | : |

| User identifier | 02 |
|---|---|
| Extraction order total number | 2 |
| Extraction order | Named entity pattern name |
| 1 | Named entity pattern I |
| 2 | Named entity pattern J |
| 3 | Named entity pattern K |
| : | : |

FIG. 10

| Set ID | 01 |
|---|---|
| Extraction order total number | 3 |
| Extraction order | Named entity pattern name |
| 1 | Named entity pattern A |
| 2 | Named entity pattern B |
| 3 | Named entity pattern C |
| : | : |

| Set ID | 02 | ... |
|---|---|---|
| Extraction order total number | 2 | |
| Extraction order | Named entity pattern name | |
| 1 | Named entity pattern I | |
| 2 | Named entity pattern J | |
| 3 | Named entity pattern K | |

FIG. 13

| Extraction order | Named entity pattern name |
|---|---|
| 1 | Named entity pattern A |
| 2 | Named entity pattern B |
| 3 | Named entity pattern C |
| : | : |

FIG. 14

| Number of texts | Extraction order total number |
|---|---|
| 1 or less | 1 |
| 2 or more and 5 or less | 2 |
| 6 or more | 3 |

FIG. 15

| Set ID | 01 |
|---|---|
| Extraction order | Named entity pattern name |
| 1 | Named entity pattern A |
| 2 | Named entity pattern B |
| 3 | Named entity pattern C |
| : | : |

| Set ID | 02 |
|---|---|
| Extraction order | Named entity pattern name |
| 1 | Named entity pattern I |
| 2 | Named entity pattern J |
| 3 | Named entity pattern K |

| Set ID | 01 |
|---|---|
| Number of texts | Extraction order total number |
| 1 or less | 1 |
| 2 or more and 5 or less | 2 |
| 6 or more | 3 |

| Set ID | 02 |
|---|---|
| Number of texts | Extraction order total number |
| 1 or less | 2 |
| 2 or more | 3 |

| Text attribute | IT document |
|---|---|
| Extraction order total number | 3 |
| Extraction order | Named entity pattern name |
| 1 | Named entity pattern E |
| 2 | Named entity pattern F |
| 3 | Named entity pattern G |
| : | : |

| Text attribute | Television program information | ... |
|---|---|---|
| Extraction order total number | 2 | |
| Extraction order | Named entity pattern name | |
| 1 | Named entity pattern M | |
| 2 | Named entity pattern N | |
| 3 | Named entity pattern L | |

FIG. 18

| Terminal name | Terminal A | |
|---|---|---|
| Extraction order total number | 3 | |
| Extraction order | Named entity pattern name | |
| 1 | Named entity pattern O | |
| 2 | Named entity pattern P | |
| 3 | Named entity pattern Q | |
| ⋮ | ⋮ | |

| Terminal name | Terminal B | |
|---|---|---|
| Extraction order total number | 2 | |
| Extraction order | Named entity pattern name | |
| 1 | Named entity pattern R | |
| 2 | Named entity pattern S | |
| 3 | Named entity pattern T | |

| Extraction order | Number of extractions |
|---|---|
| 1 | 9 |
| 2 | 6 |
| 3 | 3 |
| 4 | 1 |

FIG. 22

| Extraction order | Number of extractions |
|---|---|
| 1 | 10 |
| 2 | 7 |
| 3 | 4 |
| 4 | 1 |

FIG. 23

| Extraction order total number | 2 |
|---|---|
| Extraction order | Named entity pattern name |
| 1 | Named entity pattern A |
| 2 | Named entity pattern B |
| 3 | Named entity pattern C |
| : | : |

FIG. 24

| User identifier | 01 |
|---|---|
| Extraction order | Number of extractions |
| 1 | 10 |
| 2 | 7 |
| 3 | 4 |

| User identifier | 02 |
|---|---|
| Extraction order | Number of extractions |
| 1 | 8 |
| 2 | 3 |
| 3 | 2 |
| 4 | 1 |

FIG. 25

| Number of texts | Extraction order total number | Set ID |
|---|---|---|
| 1 or less | 1 | 01 |
| 2 or more and 5 or less | 2 | 02 |
| 6 or more | 1 | 03 |

FIG. 28

| Set ID | 01 |
|---|---|
| Extraction order total number | 2 |

| Set ID | 02 |
|---|---|
| Extraction order total number | 2 |

FIG. 30A
3-column display

| ABD | | TBZ | | | |
|---|---|---|---|---|---|
| 6:00 松下電器産業の誕生 | | 6:00 松下電器産業の株価推移 | | ⋮ | |
| 8:00 松下電器産業の発展 | | 8:00 松下電器産業の新製品紹介 | | ⋮ | |
| ⋯ | | ⋯ | | ⋯ | |

FIG. 30B
6-column display

| ABD | | TBZ | | | |
|---|---|---|---|---|---|
| 6:00 松下ドキュ… | 6:00 経済ニュース | ⋮ | ⋮ | ⋮ | ⋯ |
| 8:00 松下ドキュ… | 8:00 流行の商品… | ⋮ | ⋮ | ⋮ | ⋯ |
| ⋯ | ⋯ | ⋯ | ⋯ | ⋯ | ⋯ |

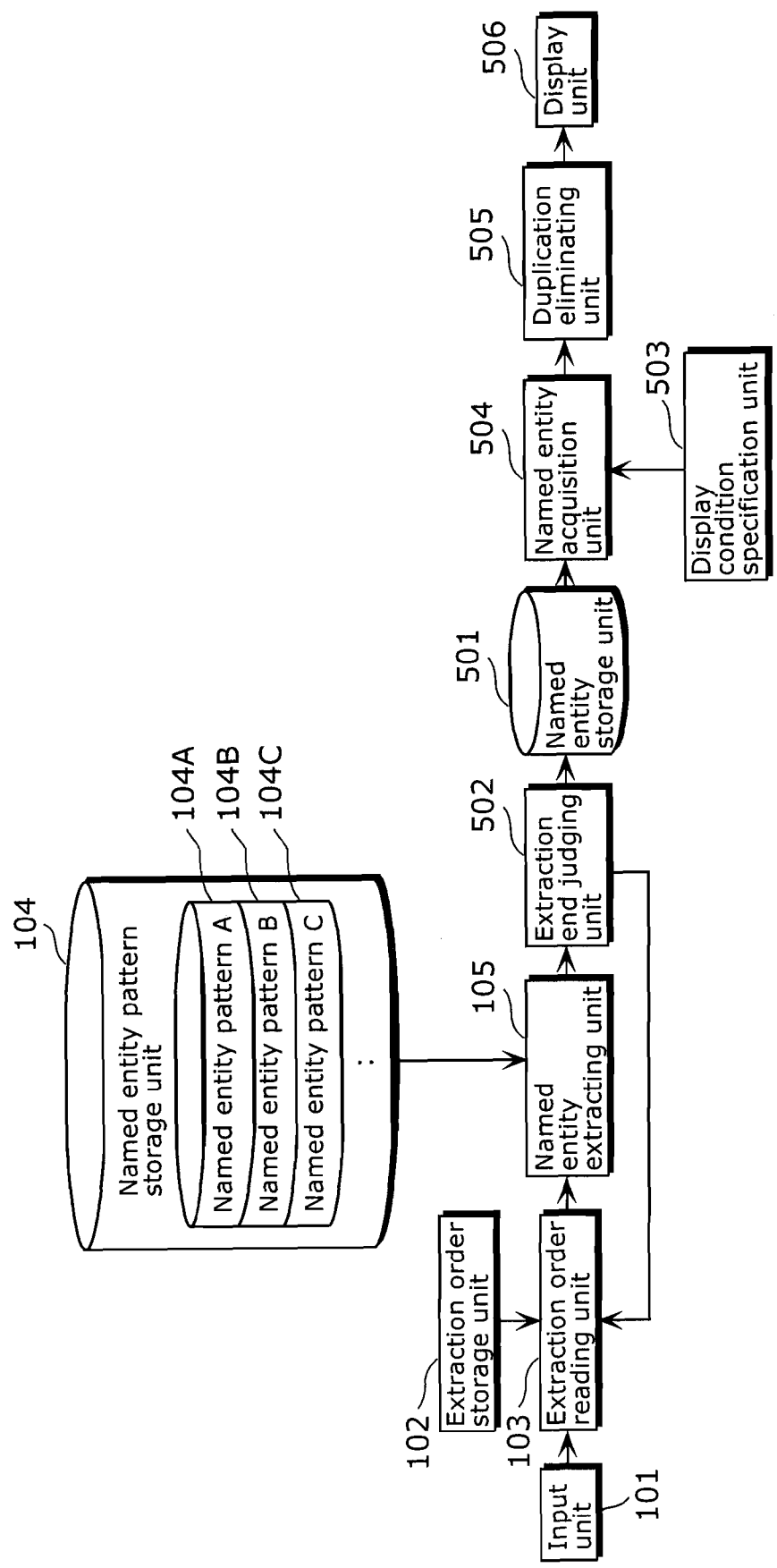

FIG. 32

| Input text | Extraction order | Named entity |
|---|---|---|
| ドキュメンタリー(1) －松上電器の誕生－ | 1 | ドキュメンタリー |
|  | 2 | ドキュメンタリー(1) |
|  | 3 | ドキュメンタリー(1) －松上電器の誕生－ |
| ドキュメンタリー(2) －松上電器の発展－ | 1 | ドキュメンタリー |
|  | 2 | ドキュメンタリー(2) |
|  | 3 | ドキュメンタリー(2) －松上電器の発展－ |
| 人間ドキュメント 松下太郎の足跡(1) | 1 | 人間ドキュメント |
|  | 2 | 人間ドキュメント 松下太郎 |
|  | 3 | 人間ドキュメント 松下太郎の足跡(1) |
| 人間ドキュメント 松下太郎の足跡(2) | 1 | 人間ドキュメント |
|  | 2 | 人間ドキュメント 松下太郎 |
|  | 3 | 人間ドキュメント 松下太郎の足跡(2) |
| ‥ | ‥ | ‥ |

- "Overseas Theater"
- Main title
- "Part 2"
- Sequence number

- "Singapore" "Television" "Theater" "Play" "Comedy"
- Main title
- "Story" Introduction
- Episodes 1 to 4

NAMED ENTITY EXTRACTING APPARATUS, METHOD, AND PROGRAM

TECHNICAL FIELD

The present invention relates to a named entity extracting apparatus capable of extracting named entities suited to a user.

BACKGROUND ART

Conventionally, a named entity extracting method is disclosed which is capable of operating a plurality of named entity extracting modules with respect to a single input text and organizing extracted named entities in order to respond to a plurality of different tasks (for example, refer to Patent Reference 1).

Here, a named entity is a specific linguistic item, such as a named entity, the name of a company, an email address, a country name, a city name, a product name, an organization name, a time, a date, a monetary expression, a proportional expression or the like, which is treated as one unit by a task.

Patent Document 1: Japanese Unexamined Patent Application Publication No. 2003-248680

DISCLOSURE OF INVENTION

Problems that Invention is to Solve

However, since a conventional named entity extracting method capable of responding to different tasks by operating a plurality of named entity extracting modules is incapable of storing types and units of extracted named entities in association with a user or a display terminal, the method is unable to extract named entities suited to the user or the display terminal. Consequently, with respect to a nested structure of named entities in which a named entity exists in a named entity, in the case where an extracted named entity is displayed, the user is forced to read a named entity containing redundant character string or a named entity that is too short to understand its meaning. For example, in information on a television program, with respect to a program having a program name that combines a main title and a subtitle, the subtitle is redundant information to a user who is capable of identifying the program just by its main title. Conversely, to a user who cannot identity the program by the main title alone, the subtitle is necessary information, and the main title and the subtitle must be combined and presented to the user.

Accordingly, the present invention has been made in consideration of the above circumstances, and an object of the present invention is to provide a named entity extracting apparatus capable of extracting named entities suited to extraction conditions expressed by an input history of a user, a display capability of a display terminal, or the like.

Means to Solve the Problems

In order to achieve the above object, the named entity extracting apparatus according to the present invention is a named entity extracting apparatus that extracts a named entity from one or more input texts by sequentially using one or more named entity patterns each indicating a judgment criterion of a named entity portion included in a text, and includes: an extraction order setting unit which sets an extraction order indicating, according to an extraction condition, a different use order of the named entity patterns; and a named entity extracting unit which extracts the named entities from the one or more input texts using the named entity patterns in an order indicated by the set extraction order.

Effects of the Invention

According to this configuration, since an order of extracting a named entity can be set according to extraction conditions, for example, with respect to a named entity having nested structures, in the case where extraction is sequentially performed beginning with a named entity having a short character string length or a long character string length, named entity extraction processing can be terminated when a named entity having an optimal character string length for a user is extracted, and thus the optimal named entity for the user or a display terminal can be extracted.

BRIEF DESCRIPTION OF DRAWINGS

FIG. 2 is a diagram showing an example of extraction orders stored in an extraction order storage unit used in the named entity extracting apparatus according to the first embodiment.

FIG. 3 is a diagram showing an example of a rule used in extraction.

FIG. 4 is a diagram showing another example of a rule used in extraction.

FIG. 5 is a diagram showing yet another example of a rule used in extraction.

FIG. 9 is a diagram showing an example of extraction orders stored in the extraction order storage unit used in the named entity extracting apparatus according to the first embodiment.

FIG. 10 is a diagram showing an example of extraction orders stored in the extraction order storage unit used in the named entity extracting apparatus according to the first embodiment.

FIG. 13 is a diagram showing an example of contents of a utilization pattern database used in the named entity extracting apparatus according to the first embodiment.

FIG. 14 is a diagram showing an example of contents of an extraction order database used in the named entity extracting apparatus according to the first embodiment.

FIG. 15 is a diagram showing an example of contents of the utilization pattern database used in the named entity extracting apparatus according to the first embodiment.

FIG. 16 is a diagram showing an example of contents of the utilization pattern database used in the named entity extracting apparatus according to the first embodiment.

FIG. 17 is a diagram showing an example of extraction orders stored in the extraction order storage unit used in the named entity extracting apparatus according to the first embodiment.

FIG. 18 is a diagram showing an example of extraction orders stored in the extraction order storage unit used in the named entity extracting apparatus according to the first embodiment.

FIG. 21 is a diagram showing an example of contents stored in an extraction number storage unit used in the named entity extracting apparatus according to the first embodiment.

FIG. 22 is a diagram showing an example of contents stored in the extraction number storage unit used in the named entity extracting apparatus according to the first embodiment.

FIG. 23 is a diagram showing an example of contents stored in the extraction number storage unit used in the named entity extracting apparatus according to the first embodiment.

FIG. 24 is a diagram showing an example of contents stored in the extraction order storage unit used in the named entity extracting apparatus according to the first embodiment.

FIG. 25 is a diagram showing an example of extraction orders stored in the extraction order storage unit used in the named entity extracting apparatus according to the first embodiment.

FIG. 28 is a diagram showing an example of extraction orders stored in an extraction order storage unit used in the named entity extracting apparatus according to the second embodiment.

FIGS. 30A and 30B are diagrams showing named entity display examples according to the second embodiment FIG. 31 is a configuration diagram showing a configuration of a named entity extracting apparatus according to a third embodiment of the present invention.

FIG. 32 is a diagram showing an example of contents stored in a named entity storage unit used in the named entity extracting apparatus according to the third embodiment.

FIGS. 37A and 37B are diagrams showing examples of Chinese input texts according to a modification.

NUMERICAL REFERENCES

Figure 1:
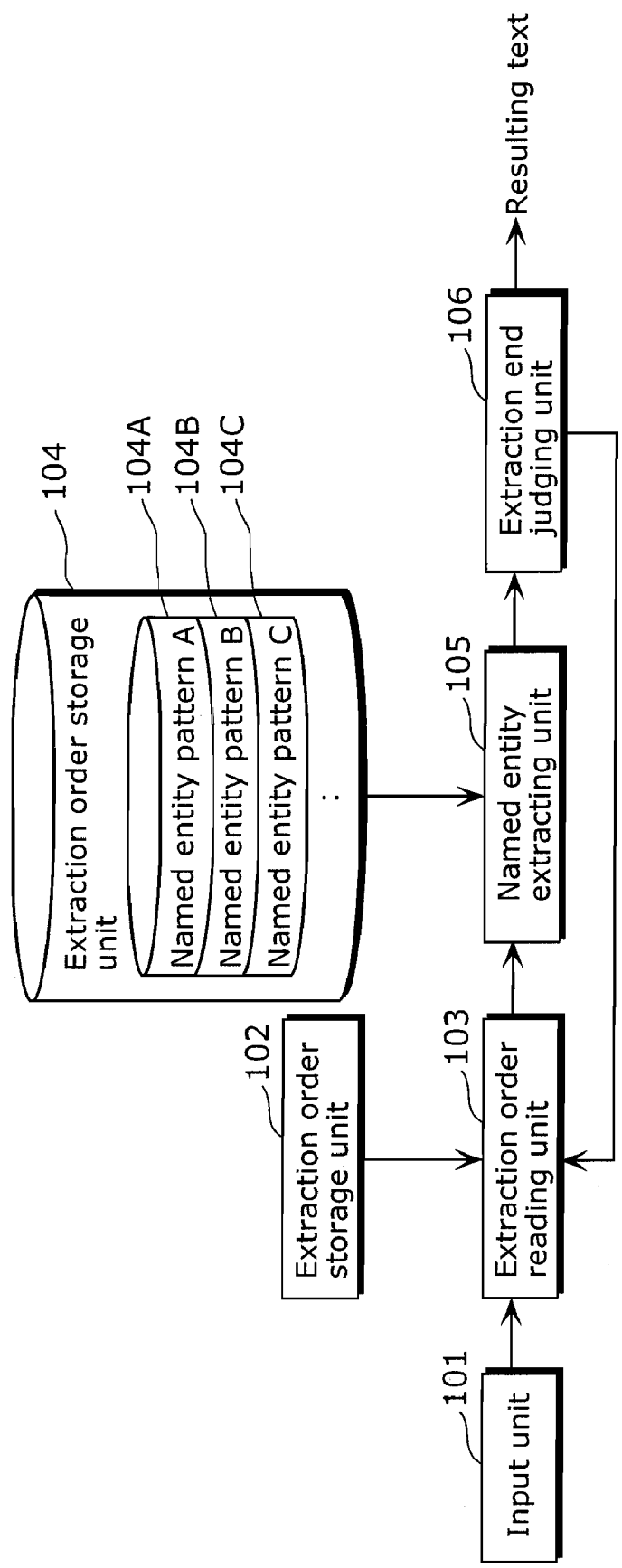
FIG. 1 is a configuration diagram of a named entity extracting apparatus according to a first embodiment.

101 Input unit
102 Extraction order storage unit
103 Extraction order reading unit
104 Named entity pattern storage unit
104A Named entity pattern A
104B Named entity pattern B
104C Named entity pattern C
105 Named entity extracting unit
106 Extraction end judging unit
201 Judging unit
202 Extraction number storage unit
203 Extraction number updating unit
204 Extraction order changing unit
301 Utilization pattern database
302 Extraction order database
303 Text search unit
304 Order total number acquisition unit
305 Utilization pattern acquisition unit
306 Information database
308 Similar text acquisition unit
309 Display unit
401 Utilization pattern database
402 Extraction order database
403 Order total number acquisition unit
404 Extraction end judging unit
405 Named entity determination unit
501 Named entity storage unit
502 Extraction end judging unit
503 Display condition acquisition unit
504 Named entity acquisition unit
505 Duplication eliminating unit
506 Display unit

BEST MODE FOR CARRYING OUT THE INVENTION

The named entity extracting apparatus according to the present invention is a named entity extracting apparatus that extracts a named entity from one or more input texts by sequentially using one or more named entity patterns each indicating a judgment criterion of a named entity portion included in a text, and includes: an extraction order setting unit that sets an extraction order, the extraction order indicating, according to an extraction condition, a different order of the named entity patterns to be used for extracting the named entity; and a named entity extracting unit that extracts the named entity from the one or more input texts using the named entity patterns in an order indicated by the determined extraction order.

Furthermore, it is possible that the extraction condition is described using at least one of: a user who utilizes the extracted named entity; a display terminal that displays the extracted named entity; an attribute of the input texts; the number of the input texts; and the number of previous named entity extractions.

Furthermore, it is possible that the input texts represent program information which constitutes an electronic program guide.

According to this configuration, since the named entity extracting apparatus sets an order of named entity patterns to be used for extracting the named entity according to an extraction condition, different extraction results can be obtained using different named entity patterns depending on, for instance, the user who uses the extracted named entity, the terminal apparatus that displays the extracted named entity, attributes of input texts, the number of input texts, the number of previous named entity extractions, and the like.

This configuration is suitable for, for example, the case where the input text represents program information constituting an electronic program guide. As a concrete example, when extracting a program title as a named entity from program information, by extracting and presenting relatively short named entity made up of only a main title to a user who is familiar with the program, and extracting and presenting relatively a long named entity made up of a main title and a subtitle to a user who is not familiar with the program, program titles whose lengths reflect optimal contents can be presented to users.

In addition, by extracting and displaying only the main title in the case where the terminal apparatus to display the extracted named entity is a mobile information terminal apparatus and by extracting and displaying the main title and the subtitle in the case where the terminal apparatus to display the extracted named entity is a home television broadcast receiver, inconveniences such as a long program title being displayed in the mobile information terminal apparatus which impairs list characteristics and thus having the opposite effect of being harder to understand for users can be reduced.

Furthermore, it is possible that the named entity extracting apparatus further includes: a named entity pattern storage unit which stores the named entity patterns; and an extraction order storage unit which stores, for each of extraction conditions, an order in which one or more of the named entity patterns stored in the named entity pattern storage unit are to be used for extracting the named entity, wherein when one of the extraction conditions is provided, the extraction order setting unit sets the extraction order to be the order of the named entity patterns stored in the named entity pattern storage unit according to the provided extraction condition.

Furthermore, it is possible that the named entity extracting apparatus further includes: a named entity pattern storage unit which stores the named entity patterns; an extraction order storage unit which stores an order in which one or more named entity patterns stored in the named entity pattern storage unit are to be used for extracting the named entity; and an extraction order changing unit that changes, according to the extraction condition, an order of the named entity patterns stored in the extraction order storage unit, wherein the extraction order setting unit sets the extraction order to be the changed order of the named entity patterns.

According to this configuration, a characteristic of the present invention in that different extraction results can be obtained using different named entity patterns depending on extraction conditions may be specifically realized by either using an extraction order corresponding to an extraction condition from a plurality of extraction orders or by changing the extraction order depending on extraction conditions.

Furthermore, it is possible that the named entity extracting apparatus uses a user identifier that identifies a user as an extraction condition, and further includes: a user identification unit that acquires the user identifier, wherein the extraction order storage unit stores, for each of user identifiers, an order of the one or more named entity patterns stored in the named entity pattern storage unit, and the extraction order setting unit sets the extraction order to be an order of the named entity patterns stored in the extraction order storage unit for the acquired user identifier. Furthermore, it is possible that the named entity extracting apparatus uses a terminal identifier of a terminal apparatus that displays an extracted named entity as an extraction condition, and further includes a terminal identifier acquisition unit that acquires the terminal identifier, wherein the extraction order storage unit stores, for each of the terminal identifiers, an order of the one or more named entity patterns stored in the named entity pattern storage unit, and the extraction order setting unit sets the extraction order to be an order of the named entity patterns stored in the extraction order storage unit for the acquired terminal identifier.

According to this configuration, as described above, a desirable named entity can be extracted for each user and for each terminal apparatus.

Furthermore, it is possible that the named entity extracting apparatus uses the attribute of the input texts as an extraction condition, and further includes an attribute acquisition unit that acquires the attribute of the input texts, wherein the extraction order storage unit stores, for each of the attributes, an order of the one or more named entity patterns stored in the named entity pattern storage unit, and the extraction order setting unit sets the extraction order to be an order of the named entity patterns stored in the extraction order storage unit for the acquired attribute.

According to this configuration, in accordance with the attribute of the input text, in the case where named entity patterns capable of appropriately extracting a named entity from the input text differ, depending on the acquired attribute, a unique named entity pattern capable of appropriately extracting the named entity from input texts having the attribute can be used, thereby contributing to the improvement of the extraction accuracy of the named entity.

For example, as described above, in the case where the input text represents program information constituting an electronic program guide, favorable extraction results can be obtained by acquiring a program category included in the program information as an attribute of the input text and, in accordance with the acquired program category, using a unique named entity pattern capable of appropriately extracting a named entity from the program information of the program category.

Furthermore, it is possible that the named entity extracting apparatus uses the number of the input texts as an extraction condition, and further includes: an information database which stores a plurality of texts, and a text search unit that searches one or more texts to become the input texts from the information database, wherein the extraction order storage unit stores, for each of values indicating the number of the texts, an order of the one or more named entity patterns stored in the named entity pattern storage unit, the extraction order setting unit sets the extraction order to be the order of the named entity patterns stored in the extraction order storage unit according to the number of the searched texts, and the named entity extracting unit extracts the named entity from the searched texts using the named entity patterns in the order indicated by the set extraction order.

According to this configuration, a named entity having a length corresponding to the number of input texts can be extracted. It is desirable that, the larger the number of input texts, the longer the named entity to be extracted in order to make it easier to distinguish among extracted named entities. This configuration can meet such a demand.

For example, as described above, when the input text represents program information constituting an electronic program guide and program titles are to be extracted as a named entity from the input texts, by extracting the named entity made up of only a main title when the number of the input texts is smaller than a predetermined threshold and by extracting the named entity made up of a main title and a subtitle when the number of the input texts is greater than a predetermined threshold, inconveniences such as a large number of similar named entities made up of only a main title being extracted, making it impossible for a user to distinguish among the named entities, can be reduced.

Furthermore, it is possible that the named entity extracting apparatus uses the number of the input texts as an extraction condition, and further includes: an information database which stores a plurality of texts, a text acquisition unit that acquires the plurality of texts from the information database; a display unit that displays the texts; and a similar text acquisition unit that acquires, from the plurality of texts acquired by the text acquisition unit, a plurality of texts that are similar when displayed on the display unit as the input texts, wherein the extraction order storage unit stores, for each of values indicating the number of the texts, an order of the one or more named entity patterns stored in the named entity pattern storage unit, the extraction order setting unit sets the extraction order to be an order of the named entity patterns stored in the extraction order storage unit according to the number of the texts acquired by the similar text acquisition unit, and the named entity extracting unit extracts the named entity from the texts acquired by the similar text acquisition unit using the named entity patterns in the order indicated by the set extraction order.

According to this configuration, a named entity having a length corresponding particularly to the number of similar input texts among input texts can be extracted. It is desirable that, the larger the number of the similar input texts, the longer the named entity to be extracted in order to make it easier to distinguish among extracted named entities. This configuration can meet such a demand.

Furthermore, it is possible that the named entity extracting apparatus uses the number of previous named entity extractions as an extraction condition, and further includes an extraction number counting unit that counts, for each of the named entity patterns stored in the extraction order storage unit, the number of previous named entity extractions using the named entity patterns, wherein the extraction order changing unit changes the order of the named entity patterns stored in the extraction order storage unit according to the counted number.

According to this configuration, since a named entity pattern not contributing to the extraction of a named entity may be prevented from being used for subsequent extractions by changing the extraction order, extraction of the named entity similar to extraction until then can be continued while reducing the amount of calculation required for the named entity extraction.

Furthermore, it is possible that the extraction order indicates the named entity patterns in an order for which, when sequentially used, an extraction of a longer named entity is expected for each use, and the named entity extracting apparatus further includes an extraction termination unit that terminates, when a named entity whose length is greater than a predetermined threshold is extracted, subsequent extractions performed using the named entity patterns.

According to this configuration, since the extraction of an unnecessarily long named entity can be avoided by determining the threshold to a length within a required limit depending on the user, the terminal apparatus or the like, a required named entity can be extracted while reducing the amount of calculation required for the named entity extraction.

The named entity extracting apparatus according to the present invention is a named entity extracting apparatus that extracts a named entity from one or more input texts by sequentially using one or more named entity patterns each indicating a judgment criterion of a named entity portion included in a text, and includes: an information database which stores a plurality of texts; a text acquisition unit that acquires the plurality of texts from the information database; a named entity pattern storage unit which stores the named entity patterns; an extraction order storage unit which stores a plurality of orders in each of which the one or more named entity patterns stored in the named entity pattern storage unit are to be used for extracting the named entities; a named entity extracting unit that extracts the named entities from the plurality of texts acquired by the text acquisition unit by using the named entity patterns in each of the orders stored in the extraction order storage unit, and organizes the extracted named entities into a named entity set for each of the orders; and a named entity determination unit that counts, for each of the named entity sets obtained by the named entity extracting unit, the number of similar named entities that is the number of similar named entities included in the named entity set, and to output a named entity set having the smallest number of the similar named entities.

According to this configuration, since a named entity set having the smallest number of similar named entities among the plurality of named entity sets is outputted, a user can obtain preferable named entities that include the fewest possible named entities that are similar and are therefore difficult to distinguish.

Furthermore, it is possible that the named entity extracting apparatus further includes a display unit that displays the texts, wherein the named entity determination unit extracts, from the named entities, partial named entities corresponding to the number of characters displayable on the display unit when counting the number of the similar named entities for each of the named entity sets, and uses the number of the similar partial named entities as the number of the similar named entities when the extracted partial named entities are similar to each other.

According to this configuration, by further considering the number of characters that can be displayed on the display unit, preferable named entities that include the fewest possible similar named entities can be obtained. As a result, for example, when using display formats each having a different number of characters used for displaying an extracted named entity, a preferable named entity that conceivably is most easily distinguished by the user in accordance with the display format can be presented.

The named entity extracting apparatus according to the present invention is a named entity extracting apparatus that extracts a named entity from one or more input texts by sequentially using one or more named entity patterns each indicating a judgment criterion of a named entity portion included in a text, and includes: a named entity pattern storage unit which stores the named entity patterns; an extraction order storage unit which stores an order in which the one or more named entity patterns stored in the named entity pattern storage unit are to be used for extracting the named entity; a named entity extracting unit that extracts the named entity from the one or more input texts by using the one or more named entity patterns in the order stored in the extraction order storage unit; a named entity storage unit which stores the input texts, the named entity extracted from the input texts, and a sequential stage in the order in which the extraction has been performed in association with each other; a display condition specification unit that specifies a predetermined sequential stage or to specify one or more named entities extracted in a common sequential stage in response to a user operation; a named entity acquisition unit that acquires, in the case where the predetermined sequential stage is specified by the display condition specification unit, all the named entities stored in association with the specified sequential stage from the named entity storage unit, and acquires, in the case where the display condition specification unit specifies the one or more named entities, the named entities stored in association with a sequential stage following the common sequential stage and the input texts corresponding to each of the specified named entities that are stored in the named entity storage unit; a duplication eliminating unit that eliminates duplication of the named entities acquired by the named entity acquisition unit; and a display unit that displays the named entities remaining after the duplication has been eliminated by the duplication eliminating unit.

According to this configuration, an extracted named entity may be displayed for each sequential stage in, for example, the direction from a simple named entity towards a complicated named entity. Therefore, the configuration is convenient for a user when confirming the extracted named entity in phases.

Furthermore, in addition to the realization of the present invention as a named entity extracting apparatus such as described above, the present invention can also be realized as a named entity extracting method that includes, as steps, processing executed by the characteristic units constituting such a named entity extracting apparatus or as a program that causes a computer to execute these steps. Moreover, it is needless to say that such programs can be distributed on a recording medium such as a CD-ROM and over a transmission medium such as the Internet.

First Embodiment

A named entity extracting apparatus according to a first embodiment of the present invention will now be described with reference to the drawings. FIG. 1 is a configuration diagram of a named entity extracting apparatus according to the first embodiment of the present invention. This named entity extracting apparatus is a named entity extracting apparatus which, in accordance with an extraction condition, sets a use order of one or more named entity patterns to be used for extraction, and extracts named entities from input texts using the named entity patterns in the set order. The named entity extracting apparatus is configured so as to include: an input unit 101; an extraction order storage unit 102; an extraction order reading unit 103; a named entity pattern storage unit 104; a named entity extracting unit 105; and an extraction end judging unit 106.

In this case, the extraction order reading unit 103 is an example of an extraction order setting unit.

The input unit 101 is constituted by an input apparatus such as a keyboard, a mouse, a remote controller or the like, and upon input of a text including a named entity by a user, outputs the inputted text as well as a value 1 as an initial value of an extraction order to be processed. In addition, the input unit 101 may be arranged to acquire a text to be presented to the user from information related to television broadcast programs, from information related to contents accumulated in a hard disk recorder or the like, or from a database storing contents existing on the Internet, and to output the acquired text and a value 1 as an initial value of an extraction order to be processed.

The extraction order storage unit 102 stores extraction orders that are orders in which named entity patterns stored in the named entity pattern storage unit 104 are used in association with named entity pattern names corresponding to the extraction orders, and also stores an extraction order total number that is a total number of extraction orders. FIG. 2 shows an example of extraction orders stored in the extraction order storage unit 102. (3, (1, named entity pattern A), (2, named entity pattern B), (3, named entity pattern C), . . . ) are stored as (the extraction order total number (extraction order, name of named entity pattern to be used)).

When a text and an extraction order is inputted, the extraction order reading unit 103 reads a name of a named entity pattern corresponding to the inputted extraction order and an extraction order total number from the extraction order storage unit 102, and outputs the inputted text, the extraction order, as well as the extraction order total number and the named entity pattern name read from the extraction order storage unit 102.

The named entity pattern storage unit 104 stores a named entity pattern A 104A that is used to extract a named entity A, a named entity pattern B 104B that is used to extract a named entity B, and a named entity pattern C 104C that is used to extract a named entity C. For example, in the case of a program name "松上電器創業記 (Matsugami denki sougyouki)(1)-誕生 (Tanjou)-", when it is assumed that a small title is the text corresponding to the main title "松上電器創業記 (Matsugami denki sougyouki)", a medium title is the text corresponding to "松上電器創業記 (Matsugami denki sougyouki)(1)" in which a sequence number is added to the small title, and a large title is the text corresponding to the entire program name "松上電器創業記 (Matsugami denki sougyouki)(1)-誕生 (Tanjou)-", when assuming that the named entity A is the small title, the named entity B is the medium title and the named entity C is the large title, the named entity pattern A 104A becomes a rule for extracting the small title, the named entity pattern B 104B becomes a rule for extracting the medium title, and the named entity pattern C 104C becomes a rule for extracting the large title. In this case, a rule is: a character string to be extracted itself; a rule for storing the character string to be extracted in association with previous/subsequent next character strings; a juncture probability of the character string to be extracted and the previous/subsequent next character strings, or the like.

As a concrete example of an extraction performed using a rule, the case where "続木貴史 (Tsuzuki Takashi)" is extracted as a personal name that is a named entity from a text "[解説 (Kaisetsu)] 続木貴史 (Tsuzuki Takashi), 松下太郎 (Matsushita Taro)" will now be described. Methods for performing such an extraction includes a method that utilizes a personal name table which stores personal names, such as that shown in FIG. 3, to extract a character string that perfectly matches a personal name included in the personal name table as a personal name from a text. Furthermore, as an example of storing a character string to be extracted in association with previous/subsequent next character strings, there is a method that utilizes a personal name regular expression table which stores patterns of previous/subsequent next character strings with respect to appearances of personal names, such as that shown in FIG. 4, to extract a character string that matches a pattern included in the personal name regular expression table as a personal name from a text. Moreover, as an example of a juncture probability of the character string to be extracted and the previous/subsequent next character strings, there is a method that utilizes a personal name probability table storing juncture probabilities of previous/subsequent next character strings with respect to appearances of personal names and personal names, such as that shown in FIG. 5, to calculate a likelihood (in the case of the personal name "続木貴史 (Tsuzuki Takashi)" in the text described above, adding the probability value "0.9" of the previous character string "]" and the probability value "0.2" of the subsequent character string ",") results in a likelihood of "1.1", and to extract as a personal name from a text when the likelihood becomes equal to or greater than a predetermined threshold.

Figure 6:
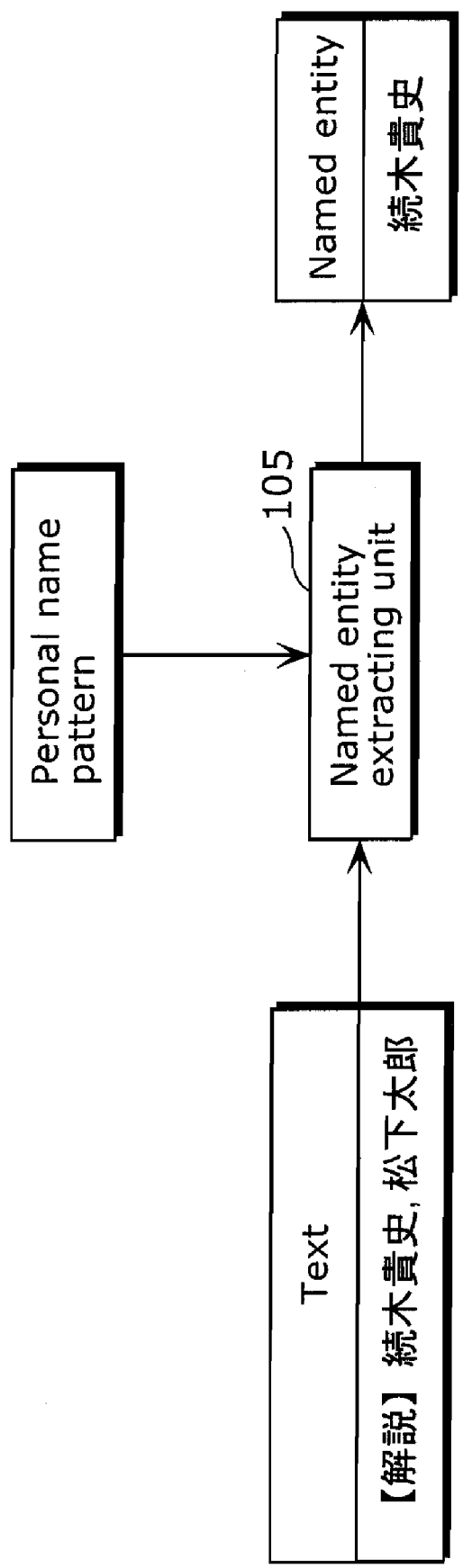
FIG. 6 is a diagram showing a concrete example of extraction performed using a rule for personal name extraction.

As shown in FIG. 6, using the personal name extraction rules (personal name patterns) exemplified in FIGS. 3 to 5 according to the above-described methods, the named entity extracting unit 105 extracts a personal name "続木貴史 (Tsuzuki Takashi)" that is an example of a named entity from the text "[続木貴史 (Kaisetsu)] 解説 (Tsuzuki Takashi), 松下太郎 (Matsushita Taro)" which includes a personal name.

In addition, in the above concrete example, while a description on character strings is given, a morpheme, a word or a named entity label that is a named entity extraction result may be used. Furthermore, a rule may be established by combining a character string with a morpheme, a word, a named entity label or the like. Moreover, in the above concrete example, while a rule targeting only one previous or one next character is established, a rule targeting a plurality of characters may be established.

Note that the named entity pattern A 104A, the named entity pattern B 104B and the named entity pattern C 104C will respectively be referred collectively as a named entity pattern.

When a text, an extraction order, an extraction order total number and a named entity pattern name are inputted from the extraction order reading unit 103, the named entity extracting unit 105 reads a named entity pattern corresponding to the inputted named entity pattern name from the named entity pattern storage unit 104, and uses the read named entity pattern to extract a named entity from the inputted text. Then, the named entity extracting unit 105 outputs a text including the extracted named entity, as well as the extraction order total number and the extraction order inputted from the extraction order reading unit 103.

When an extraction order total number, an extraction order and a text are inputted from the named entity extracting unit 105, the extraction end judging unit 106 adds a numerical value 1 to the value of the extraction order in the case where the extraction order is smaller than the extraction order total number, and outputs the extraction order after addition and the text inputted from the named entity extracting unit 105 to the extraction order reading unit 103. In addition, in the case where the extraction order is equal to or greater than the extraction order total number, the text inputted from the named entity extracting unit 105 is outputted as a resulting text that is a named entity extraction result.

Figure 7:
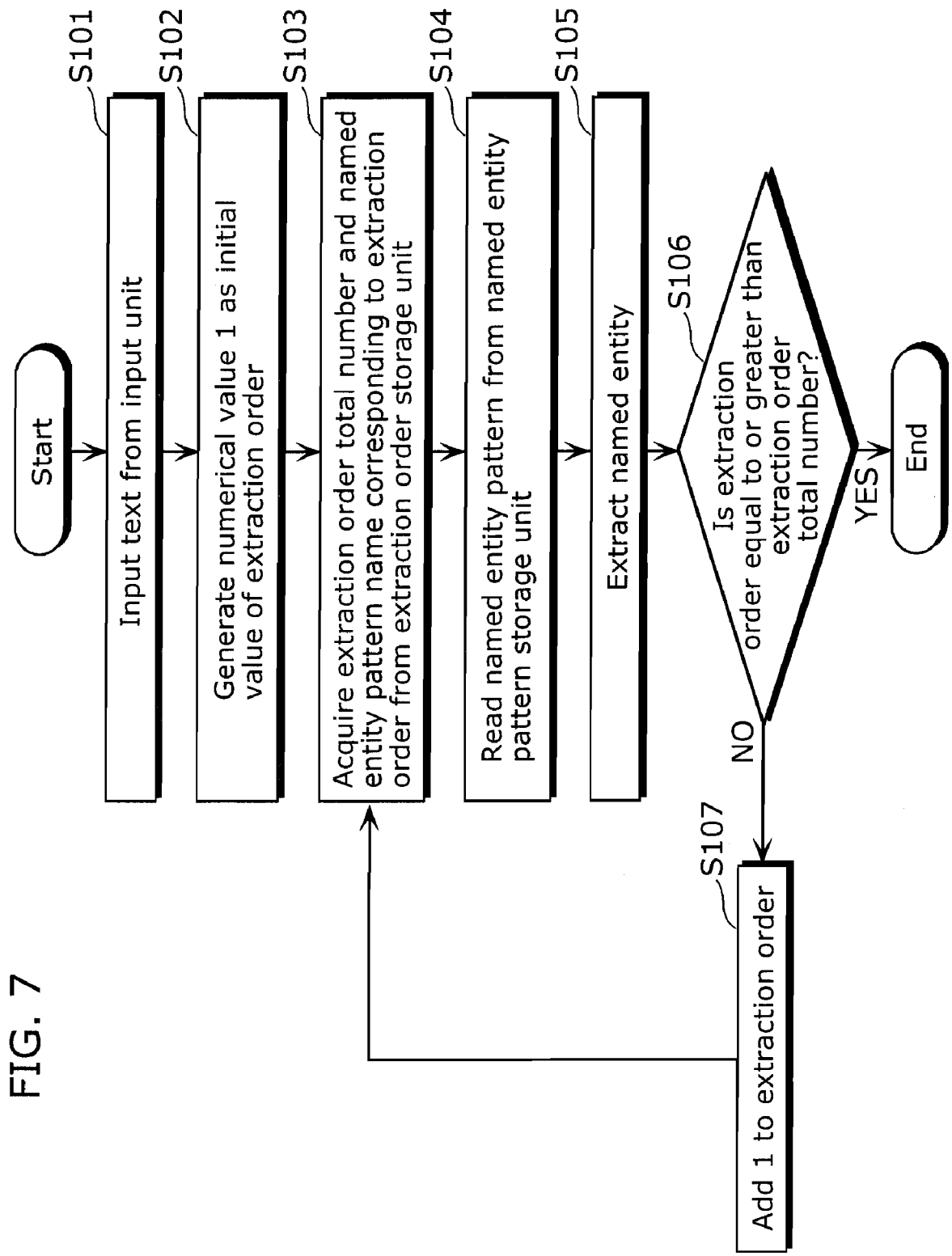
FIG. 7 is a flowchart showing operations according to the first embodiment.
Figure 8:
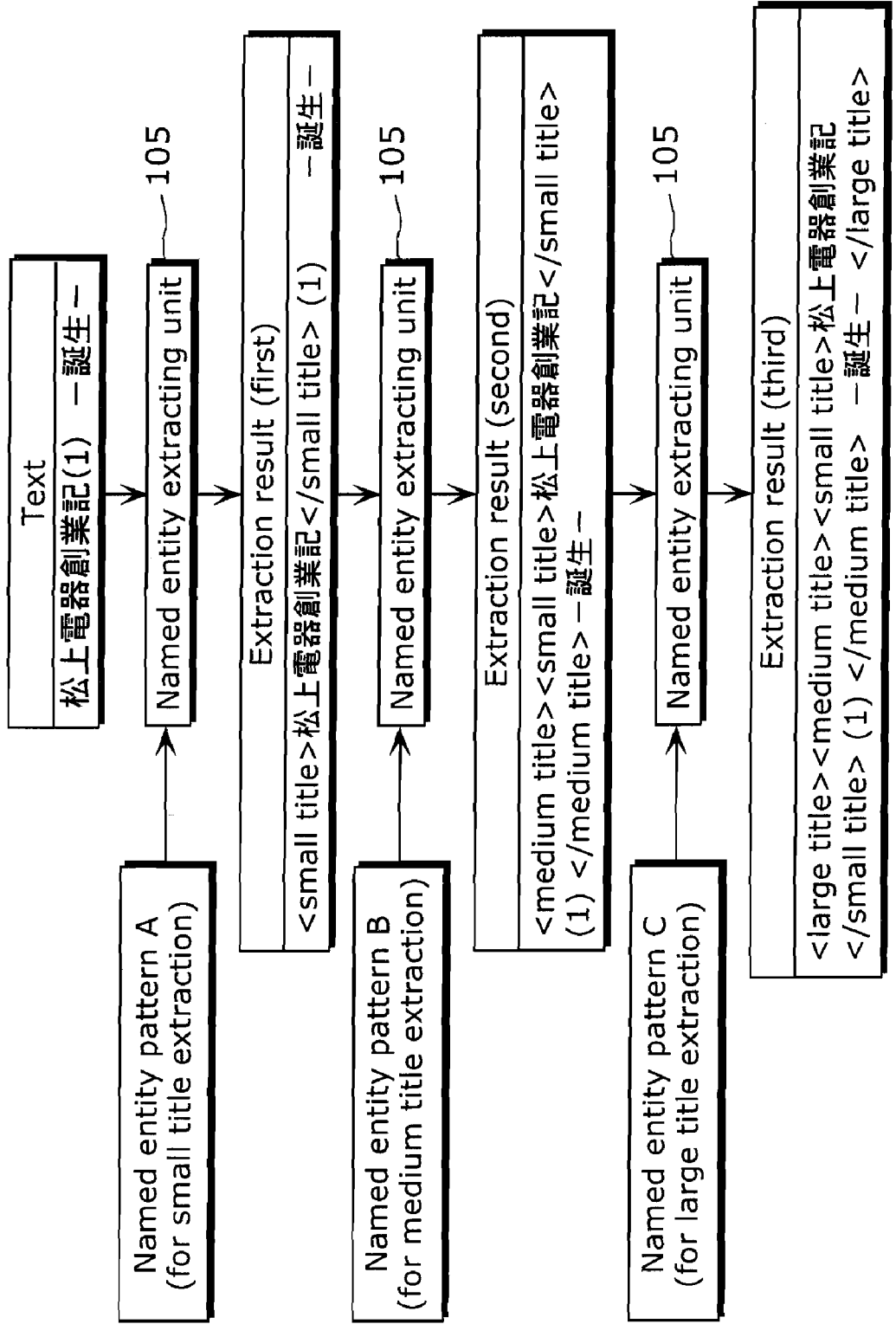
FIG. 8 is a diagram showing a concrete example of extraction results by the named entity extracting apparatus according to the first embodiment.

An example of operations of the named entity extracting apparatus according to the present embodiment and configured as described above will now be described with reference to the block diagram shown in FIG. 1, the flowchart shown in FIG. 7, and the diagram representing a concrete example of an extraction result shown in FIG. 8. A user inputs a text including a named entity from the input unit 101 (step S101). When a text including a named entity is inputted, the input unit 101 outputs the inputted text and a value 1 as an initial value of an extraction order to be processed to the extraction order reading unit 103 (step S102). As a concrete example, when the user inputs a text "松上電器創業記 (Matsugami denki sougyouki)(1)-誕生 (Tanjou)-" that is a program name from the input unit 101, the input unit 101 outputs the inputted text "松上電器創業記 (Matsugami denki sougyouki)(1)-誕生 (Tanjou)-" and a value 1 as an extraction order initial value to the extraction order reading unit 103.

When a text and an extraction order is inputted from the input unit 101, the extraction order reading unit 103 reads a named entity pattern name corresponding to the inputted extraction order and an extraction order total number from the extraction order storage unit 102 (step S103), and outputs the inputted text, the extraction order, and the extraction order total number and the named entity pattern name read from the extraction order storage unit 102. In the above-described example, when the text "松上電器創業記 (Matsugami denki sougyouki)(1)-誕生 (Tanjou)-" and the extraction order value 1 are inputted, the extraction order reading unit 103 reads a named entity pattern name "named entity pattern A" corresponding to the inputted extraction order value 1 and a value 3 of the extraction order total number from the extraction order storage unit 102, and outputs the inputted text "松上電器創業記 (Matsugami denki sougyouki)(1)-誕生 (Tanjou)-", the extraction order value 1, the extraction order total number value 3 and the named entity pattern name "named entity pattern A" to the named entity extracting unit 105.

When a text, an extraction order, an extraction order total number and a named entity pattern name are inputted from the extraction order reading unit 103, the named entity extracting unit 105 reads a named entity pattern corresponding to the inputted named entity pattern name from the named entity pattern storage unit 104 (step S104), and uses the read named entity pattern to extract a named entity from the inputted text (step S105). Then, the named entity extracting unit 105 outputs a text including the extracted named entity as well as the extraction order total number and the extraction order inputted from the extraction order reading unit 103.

In the above-described example, when the text "松上電器創業記 (Matsugami denki sougyouki)(1)-誕生 (Tanjou)-", the extraction order value 1, the extraction order total number value 3 and the named entity pattern name "named entity pattern A" are inputted from the extraction order reading unit 103, the named entity extracting unit 105 reads a named entity pattern "named entity pattern A" corresponding to the inputted named entity pattern name "named entity pattern A" from the named entity pattern storage unit 104, and uses the read named entity pattern "named entity pattern A" to extract a named entity from the inputted text "松上電器創業記 (Matsugami denki sougyouki)(1)-誕生 (Tanjou)-".

In this case, since the named entity pattern "named entity pattern A" is a pattern that extracts a small title, a text "松上電器創業記 (Matsugami denki sougyouki)" that is a portion of the text "松上電器創業記 (Matsugami denki sougyouki)(1)-誕生 (Tanjou)-" is extracted as a name entity that is a "small title". Here, as an example, the extracted named entity is enclosed between "<type of named entity>" and "</type of named entity>", such as "<small title>松上電器創業記 (Matsugami denki sougyouki)</small title>(1)-誕生 (Tanjou)-". Then, the named entity extracting unit 105 outputs the text "<small title>松上電器創業記 (Matsugami denki sougyouki)</small title>(1)-誕生 (Tanjou)-" including the extracted named entity, the extraction order total number value 3 and the extraction order value 1 to the extraction end judging unit 106 (the extraction result (first) shown in FIG. 8).

When an extraction order total number, an extraction order and a text are inputted from the named entity extracting unit 105, when the extraction order is smaller than the extraction order total number (step S106), the extraction end judging unit 106 adds a numerical value 1 to the value of the extraction order (step S107), and outputs the extraction order after addition and the text inputted from the named entity extracting unit 105 to the extraction order reading unit 103. In addition, when the extraction order is equal to or greater than the extraction order total number (step S106), the text inputted from the named entity extracting unit 105 is outputted as a resulting text that is a named entity extraction result.

In the above-described example, when the extraction order total number value 3, the extraction order value 1 and the text "<small title>松上電器創業記 (Matsugami denki sougyouki)</small title>(1)-誕生 (Tanjou)-" are inputted from the named entity extracting unit 105, since the extraction order value 1 is smaller than the extraction order total number value 3, the extraction end judging unit 106 adds a numerical value 1 to the extraction order value 1 to change the value to 2, and outputs the extraction order value 2 and the text "<small title>松上電器創業記 (Matsugami denki sougyouki)</small title>(1)-誕生 (Tanjou)-" to the extraction order reading unit 103.

Subsequently, the same processing as described above is performed at the extraction order reading unit 103 and the named entity extracting unit 105, and the extraction order total number value 3, the extraction order value 2 and the text "<medium title><small title>松上電器創業記 (Matsugami denki sougyouki)</small title>(1)</medium title>-誕生 (Tanjou)-" are inputted to the extraction end judging unit 106 from the named entity extracting unit 105. However, since the extraction order value 2 is smaller than the extraction order total number value 3, the extraction end judging unit 106 adds a numerical value 1 to the extraction order value 2 to change the value to 3, and outputs the extraction order value 3 and the text "<medium title><small title>松上電器創業記 (Matsugami denki sougyouki)</small title>(1)</medium title>-誕生 (Tanjou)-" to the extraction order reading unit 103 (the extraction result (second) shown in FIG. 8).

Further subsequently, the same processing as described above is performed at the extraction order reading unit 103 and the named entity extracting unit 105, and the extraction order total number value 3, the extraction order value 3 and the text "<large title><medium title><small title>松上電器創業記 (Matsugami denki sougyouki)</small title>(1)</medium title>-誕生 (Tanjou)-</large title>" are inputted to the extraction end judging unit 106 from the named entity extracting unit 105. Since the extraction order value 3 is equal to or greater than the extraction order total number value 3, the extraction end judging unit 106 outputs the text "<large title><medium title><small title>松上電器創業記 (Matsugami denki sougyouki)</small title>(1)</medium title>-誕生 (Tanjou)-</large title>" as a resulting text that is a named entity extraction result (the extraction result (third) shown in FIG. 8).

Note that, in the above example, while the extraction order storage unit 102 is arranged to store an extraction order total number, an extraction order, and a named entity pattern name in association with the extraction order as a set, a set made up of the extraction order total number, the extraction order, and the named entity pattern name may be arranged to be stored in association with a user identifier that identifies a user. When a text and an extraction order is inputted from the input unit 101 and a user identifier is further inputted, the extraction order reading unit 103 may be arranged to read a named entity pattern name and an extraction order total number corresponding to an extraction order inputted for the set made up of the extraction order total number, the extraction order, and the named entity pattern name corresponding to the inputted user identifier from the extraction order storage unit 102, and to output the inputted text, the extraction order, the user identifier, as well as the named entity pattern name and the extraction order total number read from the extraction order storage unit 102.

In this case, the input unit 101 is an example of a user identification unit.

In this case, in addition to the operations in the example described above, the named entity extracting unit 105 and the extraction end judging unit 106 are arranged to output a user identifier outputted from the extraction order reading unit 103 without modification. As a concrete example, it is assumed that the extraction order storage unit 102 stores (01, 3, (1, named entity pattern A), (2, named entity pattern B), (3, named entity pattern C), . . . ), (02, 2, (1, named entity pattern I), (2, named entity pattern J), (3, named entity pattern K), . . . ), . . . , as sets of (user identifier, extraction order total number, (extraction order, named entity pattern name)). The contents of the extraction order storage unit 102 in this case are as shown in FIG. 9. Furthermore, when a user identifier "01", a text "松上電器創業記 (Matsugami denki sougyouki)(1)-誕生 (Tanjou)-" and an extraction order value 1 are inputted from the input unit 101, the extraction order reading unit 103 reads a named entity pattern name "named entity pattern A" corresponding to the inputted extraction order value 1 and the extraction order total number value 3 from the extraction order storage unit 102 for (01, 3, (1, named entity pattern A), (2, named entity pattern B), (3, named entity pattern C), . . . ) that is the set of (user identifier, extraction order total number, (extraction order, named entity pattern name)) corresponding to the inputted user identifier "01", and outputs the inputted text "松上電器創業記 (Matsugami denki sougyouki)(1)-誕生 (Tanjou)-", the extraction order value 1, the user identifier "01", the extraction order total number value 3 and the named entity pattern name "named entity pattern A" to the named entity extracting unit 105. At the named entity extracting unit 105 and the extraction end judging unit 106 hereinafter, the user identifier "01" is outputted in addition to the operations of the above-described example. Consequently, the order of extracting named entities, or the named entities to be extracted, can be changed for each user, and a named entity suitable for the user can be extracted.

Next, a modification of the extraction order storage unit 102 will be described with reference to FIG. 10.

The extraction order storage unit 102 may be arranged to organize an extraction order total number, an extraction order, and a named entity pattern name in association with the extraction order as a set, retain a plurality of these sets, and manage each set by attaching a set ID corresponding to the type of named entity to be extracted. When a set ID, a text and an extraction order are inputted from the input unit 101, the extraction order reading unit 103 may be arranged to read a named entity pattern name and an extraction order total number corresponding to an extraction order inputted for the set made up of the extraction order total number, the extraction order, and the named entity pattern name corresponding to the inputted set ID from the extraction order storage unit 102, and to output the inputted text, the extraction order, the set ID, as well as the named entity pattern name and the extraction order total number read from the extraction order storage unit 102.

In this case, the set ID functions as information indicating an extraction condition, and by the read operation described earlier, the extraction order reading unit 103 sets named entity patterns ordered and stored in the extraction order storage unit 102 in correspondence with the set ID as one or more named entity patterns to be used for extraction and an order of use thereof. Furthermore, in addition to the operations in the example described above, the named entity extracting unit 105 and the extraction end judging unit 106 are arranged to output the set ID outputted from the extraction order reading unit 103 without modification.

As a concrete example, it is assumed that the extraction order storage unit 102 stores (01, 3, (1, named entity pattern A), (2, named entity pattern B), (3, named entity pattern C), . . . ), (02, 2, (1, named entity pattern I), (2, named entity pattern J)), . . . , as sets of (set ID, extraction order total number, (extraction order, named entity pattern name)). The contents of the extraction order storage unit 102 in this case are as shown in FIG. 10. Furthermore, for (01, 3, (1, named entity pattern A), (2, named entity pattern B), (3, named entity pattern C), . . . ) that is the set of (set ID, extraction order total number, (extraction order, named entity pattern name)) corresponding to the set ID "01" inputted from the input unit 101, the extraction order reading unit 103 reads a named entity pattern name "named entity pattern A" corresponding to the inputted extraction order value 1 and the extraction order total number value 3 from the extraction order storage unit 102, and outputs the inputted text " 松上電器創業記 (Matsugami denki sougyouki)(1)-誕生 (Tanjou)-", the extraction order value 1, the set ID "01", the extraction order total number value 3 and the named entity pattern name "named entity pattern A" to the named entity extracting unit 105. At the named entity extracting unit 105 and the extraction end judging unit 106 hereinafter, the set ID "01" is outputted in addition to the operations of the above-described example.

Consequently, in the example described above, the user is able to extract a text related to the program name from the input text by specifying the set ID "01", and as a further example, if it is assumed that the named entity pattern I is a rule for extracting a last name of a personal name, the named entity pattern J is a rule for extracting a first name of a personal name and the named entity pattern K is a rule for extracting first and last names of a personal name, the user is able to extract a text related to a personal name from the input text by specifying the set ID "02". In other words, the user can specify a named entity that he/she desires to extract.

In addition, while the set ID described above corresponds to the type of named entity to be extracted, the set ID may be arranged to be a terminal identifier that identifies a terminal that displays named entities to be extracted, and by further arranging the input unit 101 to be capable of acquiring the terminal identifier of a terminal that displays the named entities, named entities corresponding to the terminal can be extracted. In this case, the input unit 101 is an example of a terminal identifier acquisition unit.

Consequently, even in the case where useful named entities differ according to display terminals such as the case of a named entity that is a program name being useful for television but not required for a CD player, since a named entity to be extracted may be set for each display terminal, it is no longer necessary to display information that is redundant to a display terminal.

Next, an example that uses the number of input texts as an extraction condition will be described with reference to FIGS. 11 to 14.

Figure 11:
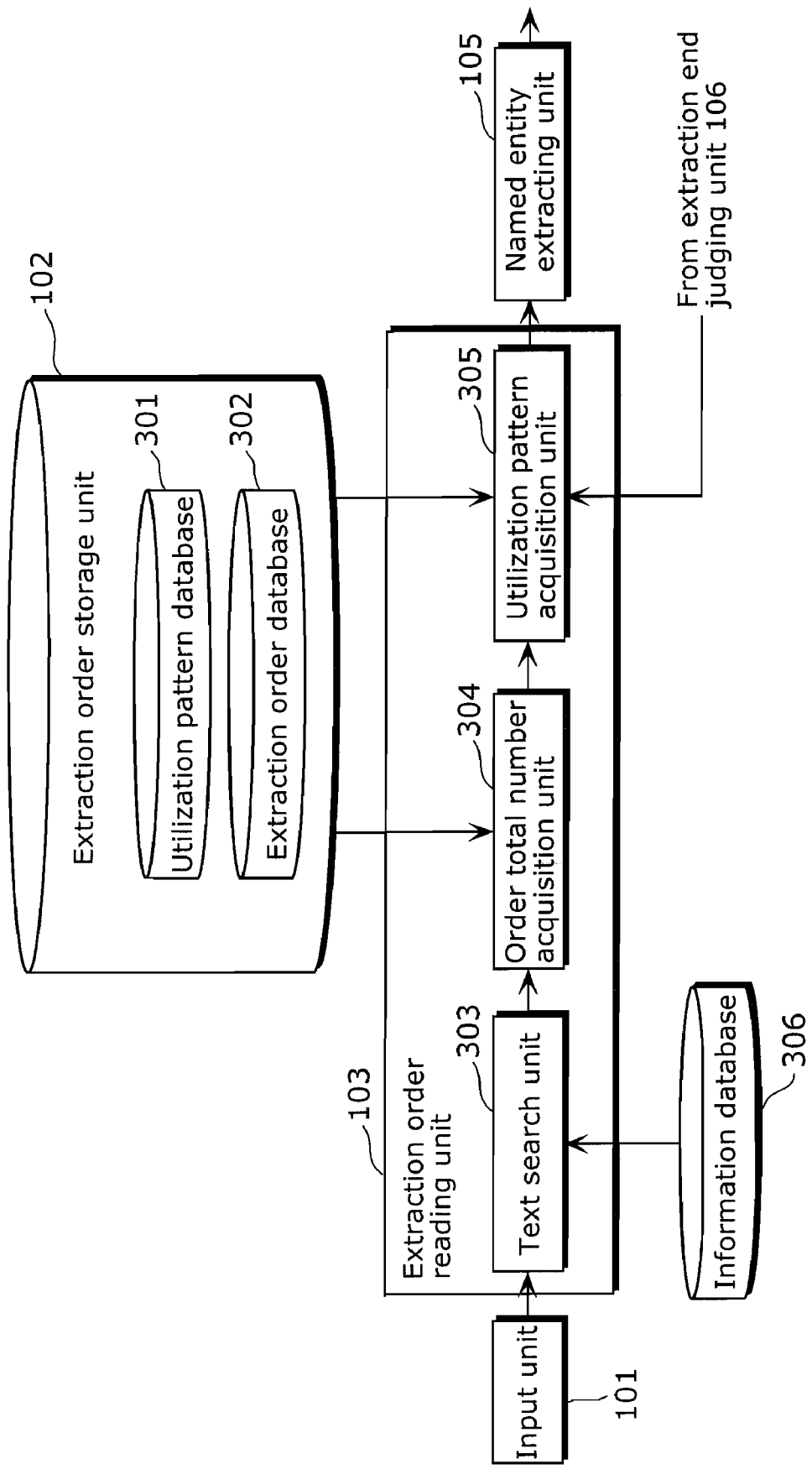
FIG. 11 is a configuration diagram showing an example of an extraction order reading unit used in the named entity extracting apparatus according to the first embodiment.

As shown in FIG. 11, a named entity extracting apparatus in this case is configured as an apparatus which searches an information database 306 storing information regarding television broadcast programs, information regarding contents accumulated in a hard disk recorder or the like, or text information regarding contents existing on the Internet by using a text inputted by the user from the input unit 101 as a search keyword and which performs named entity extraction on a searched text. The extraction order storage unit 102 may be arranged to include a utilization pattern database 301 storing extraction orders and named entity pattern names corresponding to the extraction orders, and an extraction order database 302 that stores the number of texts in the case where texts that include a portion of the text inputted by the user from the input unit 101 exist in the information database in association with an extraction order total number. The extraction order reading unit 103 may be arranged to further include a text search unit 303, an order total number acquisition unit 304 and a utilization pattern acquisition unit 305. When a text and an extraction order initial value are inputted from the input unit 101, the text search unit 303 acquires texts including a portion of the input text from the information database 306, and outputs search result texts and an extraction order to the order total number acquisition unit 304. When search result texts and an extraction order are inputted from the text search unit 303, the order total number acquisition unit 304 acquires an extraction order total number corresponding to the number of texts of the inputted search result texts from the extraction order database 302 of the extraction order storage unit 102, and outputs the acquired extraction order total number, the search result texts and an extraction order to the utilization pattern acquisition unit 305. When the search result texts, the extraction order total number and the extraction order is inputted from the order total number acquisition unit 304, the utilization pattern acquisition unit 305 acquires a named entity pattern name corresponding to the inputted extraction order from the utilization pattern database 301 of the extraction order storage unit 102, and outputs the acquired named entity pattern name, the search result texts, the extraction order total number and the extraction order to the named entity extracting unit 105.

Figure 12:
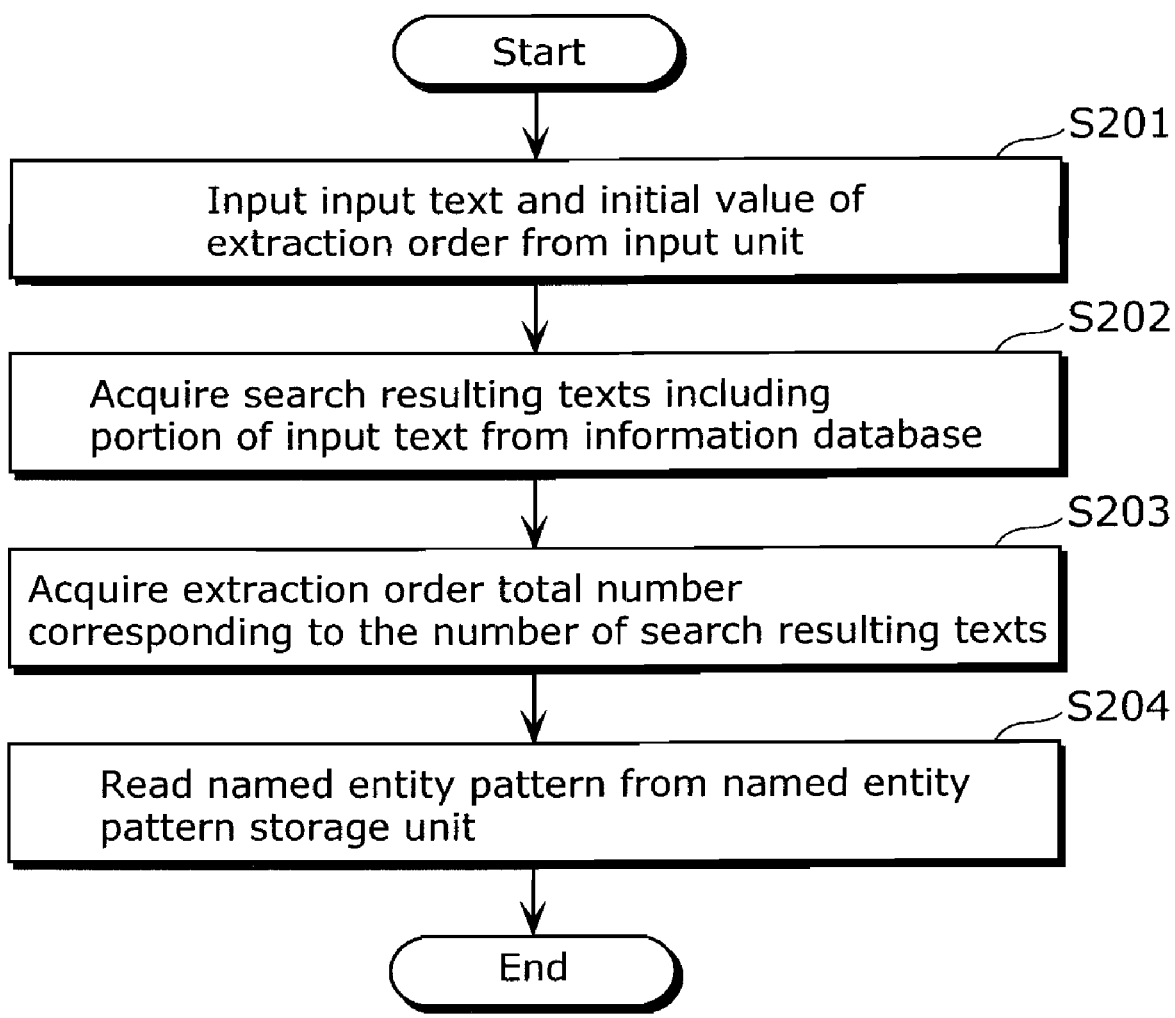
FIG. 12 is a flowchart showing an example of operations according to the first embodiment.

A block diagram and a flowchart of the extraction order storage unit 102 and the extraction order reading unit 103 in this case are respectively shown in FIGS. 11 and 12, and an example of operations will now be described. In addition, FIG. 13 shows an example of contents of the utilization pattern database 301 which stores ((1, named entity pattern A), (2, named entity pattern B), (3, named entity pattern C), . . . ) as (extraction order, named entity pattern name). FIG. 14 shows an example of contents of the extraction order database 302 which stores ((1 or less, 1), (2 or more and 5 or less, 2), (6 or more, 3)) as (number of texts, extraction order total number).

In the above example, when the text " 松上電器創業記 (Matsugami denki sougyouki)" and the extraction order initial value 1 are inputted from the input unit 101 (step S201), it is assumed that the text search unit 303 acquires texts " 松上電器創業記 (Matsugami denki sougyouki)(1)-誕生 (Tanjou)-" and " 松上電器創業記 (Matsugami denki sougyouki)(2)-発展 (Hatten)-" which include the input text from the information database (step S202), and outputs the search result texts " 松上電器創業記 (Matsugami denki sougyouki)(1)-誕生 (Tanjou)-" and " 松上電器創業記 (Matsugami denki sougyouki)(2)-発展 (Hatten)-" and the extraction order value 1 to the order total number acquisition unit 304. When the search result texts " 松上電器創業記 (Matsugami denki sougyouki)(1)-誕生 (Tanjou)-" and " 松上電器創業記 (Matsugami denki sougyouki)(2)-発展 (Hatten)-" and the extraction order value 1 are inputted from the text search unit 303, the order total number acquisition unit 304 acquires an extraction order total number 2 corresponding to the number of texts 2 of the inputted search result texts from the extraction order database 302 of the extraction order storage unit 102 (step S203), and outputs this extraction order total number 2, the search result texts and the extraction order value 1 to the utilization pattern acquisition unit 305. When the search result texts, the extraction order total number and the extraction order is inputted from the order total number acquisition unit 304, the utilization pattern acquisition unit 305 acquires a named entity pattern name "named entity pattern A" corresponding to the extraction order value 1 inputted from the utilization pattern database 301 of the extraction order storage unit 102 (step S204), and outputs this named entity pattern name "named entity pattern A", the search result texts, the extraction order total number 2 and the extraction order value 1 to the named entity extracting unit 105.

As a result of repeating the above-described processing for a period in which the extraction order value is smaller than the extraction order total number, resulting texts "<medium title><small title>松上電器創業記 (Matsugami denki sougyouki)</small title>(1)</medium title>-誕生 (Tanjou)-" and "<medium title><small title>松上電器創業記 (Matsugami denki sougyouki)</small title>(2)</medium title>-発展 (Hatten)-" are obtained.

In addition, in the example described above, while the text "松上電器創業記 (Matsugami denki sougyouki)" to be searched is inputted from the input unit 101, in the case where information included in the information database 306 is, like electronic program table information or music information, made up of a title, a genre, a time length, cast members and the like with respect to contents (program or music), a genre or the like may be inputted from the input unit 101 and the text search unit 303 may use a search result text searched from the information database 306 as a title corresponding to the inputted genre.

Next, the case where a plurality of utilization pattern databases exist will be described with reference to FIGS. 15 to 18. In this case, in order to associate a utilization pattern database with an extraction order database, management should be performed by a common ID corresponding to the type of named entity to be extracted. FIGS. 15 and 16 respectively show a utilization pattern database and an extraction order database correlated by a set ID that is a common ID. In this case, it is assumed that a set ID is used as an extraction condition together with the number of input texts, and the set ID is further inputted from the input unit 101, and that the extraction order reading unit 103 references the utilization pattern database and the extraction order database corresponding to the set ID inputted from the input unit 101 to acquire an extraction order total number and a named entity pattern name. As described above, through such an acquisition operation, the extraction order reading unit 103 sets named entity patterns ordered and stored in the extraction order storage unit 102 in association with a set ID as one or more named entity patterns used for extraction and the order of use thereof.

In addition, in the example described above, while a set ID is arranged to be inputted from the input unit 101, a set ID may also be stored in association with the number of texts in the extraction order database 302, and the extraction order reading unit 103 may be arranged to acquire an extraction order total number and a set ID corresponding to the number of search result texts from the extraction order database 302 and further, to reference a utilization pattern database corresponding to the set ID to acquire a named entity pattern name.

Through such an acquisition operation, the extraction order reading unit 103 sets named entity patterns ordered and stored in the extraction order storage unit 102 in association with the number of search result texts as one or more named entity patterns used for extraction and the order of use thereof. An example of the extraction order database 302 in this case is shown in FIG. 25.

Furthermore, at the extraction order reading unit 103, while named entity patterns to be used for extraction and an order of use thereof are set based on the number of search result texts searched by the text search unit 303, in the case where the present example further includes a display unit, the text search unit 303 may be arranged to set named entity patterns to be used for extraction and an order of use thereof based on the number of texts that are similar when displayed by extracting a text corresponding to the number of characters displayable on the display unit from the searched search result texts and outputting the plurality of extracted search result texts having similar texts as a similar text group to the order total number acquisition unit 304.

Figure 26:
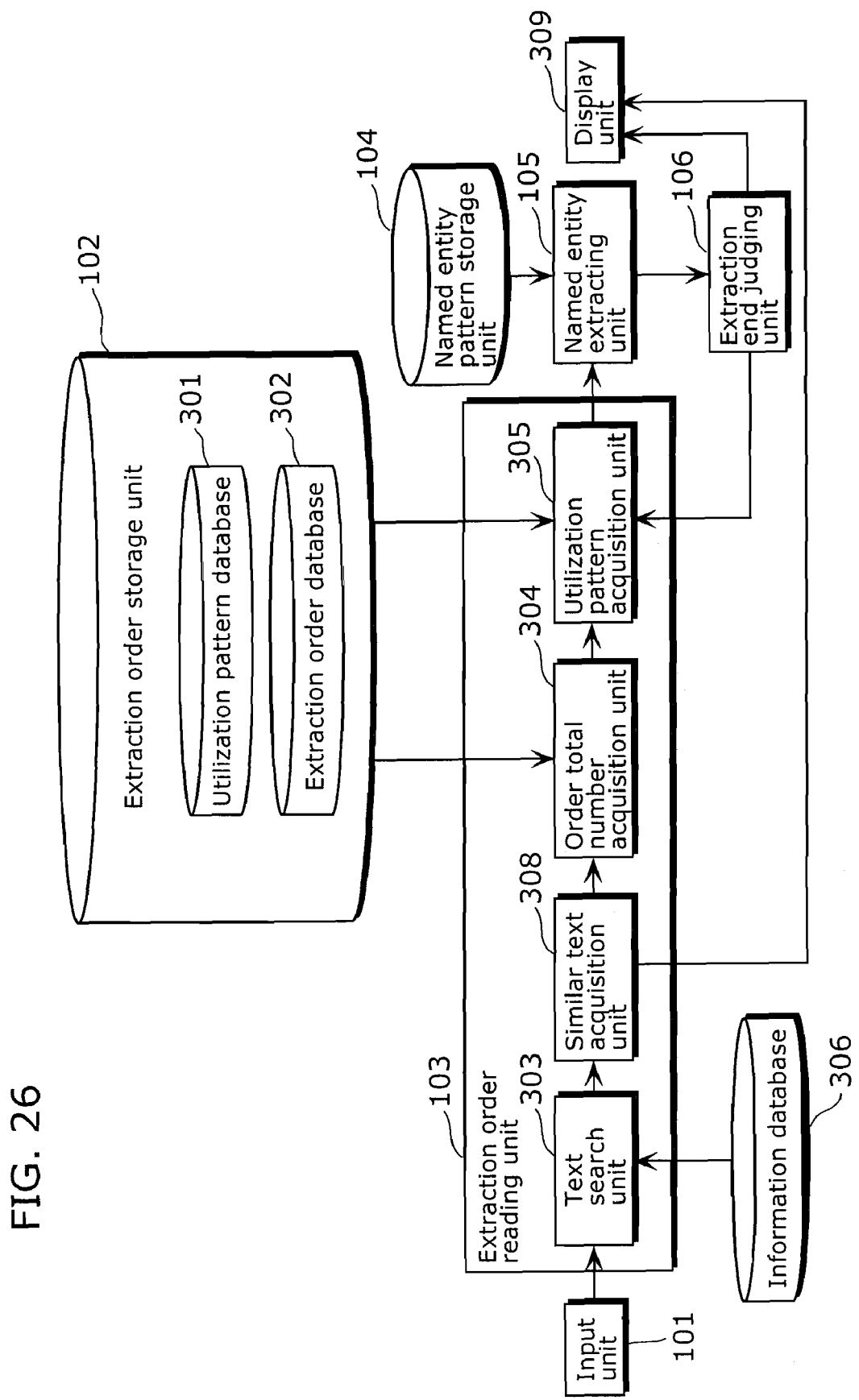
FIG. 26 is a configuration diagram of a named entity extracting apparatus according to a modification of the first embodiment.

FIG. 26 is a configuration diagram of a named entity extracting apparatus according to such a modification. Compared to the named entity extracting apparatus shown in FIG. 11, a similar text acquisition unit 308 and a display unit 309 is added to this named entity extracting apparatus.

Now, as a concrete example, a case will be considered where a genre "documentary" is inputted to the text search unit 303 from the input unit 101, the text search unit 303 searches texts "ドキュメンタリ-(Dokyumentari)-松上電器の歴史 (Matsugami denki no rekishi)-", "人間ドキュメント (Ningen dokyumento) 松下の足跡 (Matsushita no sokuseki)(1)" and "人間ドキュメント (Ningen dokyumento)(Ningen dokyumento) 松下の足跡 (Matsushita no sokuseki)(2)" from the information database 306, and the number of kana-kanji (Chinese) characters displayable by the display unit 309 per one named entity is 8.

In this case, the similar text acquisition unit 308 performs similarity judgment by extracting the texts "ドキュメンタリ (Dokyumentari)", "人間ドキュメント (Ningen dokyumento)" and "人間ドキュメント (Ningen dokyumento)" that are the first 8 kana-kanji characters from the searched texts, outputs the texts "人間ドキュメント (Ningen dokyumento) 松下の足跡 (Matsushita no sokuseki)(1)" and "人間ドキュメント (Ningen dokyumento) 松下の足跡 (Matsushita no sokuseki)(2)" corresponding to "人間ドキュメント (Ningen dokyumento)" that is judged to be the same text as a similar text group to the order total number acquisition unit 304, and outputs the text "ドキュメンタリ-(Dokyumentari)-松上電器の歴史 (Matsugami denki no rekishi)-" corresponding to the text "ドキュメンタリ-(Dokyumentari)" that is judged to be dissimilar as a resulting text to the display unit 309.

Subsequently, the order total number acquisition unit 304 references the extraction order database 302 shown in FIG. 25 and acquires an extraction order total number 2 and a set ID value 02, and the utilization pattern acquisition unit 305 acquires a named entity pattern I when the extraction order is 1 and acquires a named entity pattern J when the extraction order is 2 by referencing the utilization pattern database 301. At this point, it is assumed that, for example, the use of the named entity pattern I results in the extraction of a portion corresponding to a subtitle as a small title from the program name text, while the use of the named entity pattern J results in the extraction of a portion combining the subtitle and a sequence number following the subtitle as a medium title from the program name text. As a result, texts "松下の足跡 (Matsushita no sokuseki)(1)" and "松下の足跡 (Matsushita no sokuseki)(2)" are ultimately respectively extracted as resulting texts from the texts "人間ドキュメント (Ningen dokyumento) 松下太郎の足跡 (Matsushita Taro no sokuseki)(1)" and "人間ドキュメント (Ningen dokyumento) 松下太郎の足跡 (Matsushita Taro no sokuseki)(2)".

In addition, while it has been described that same texts are assumed to be similar texts when the similar text acquisition unit 308 judges similar texts, a similar text judgment may be arranged to be made when the number of same character strings is equal to or greater than the number of characters that make up a specific percentage of the number of displayed characters. For example, when it is assumed that the number of displayed characters is 10 and the specific percentage is 80%, a similar text judgment is made when the number of same characters in character strings is equal to or greater than 8.

Consequently, since a search result text determined to be other than a similar text group by the similar text acquisition unit 308 is displayed without modification on the display unit 309, and for a similar text group, minimal named entities required by the user to identify texts can be displayed on the display unit 309, when displaying search result texts on the display unit, minimal named entities required by the user to identify texts can be extracted while also taking into consideration the number of characters displayable on the display unit.

Therefore, when the same character string is included in search result texts, since minimal named entities required by the user to identify texts can be extracted, it is now possible to avoid extracting character strings that are redundant to the user.

In addition, in the present invention, since the extraction performance of named entities declines when processing is performed on a text whose format differs from a text used when learning a named entity pattern, management may be arranged to be performed using, instead of the above-described set ID, text attributes indicating a format name or a text type such as, for example, "IT document" as an attribute when the text is an IT-related document and "television program information", "text related to drama", "program name" and the like as attributes when the text is a text of television program information. In this case, in addition to a text attribute inputted by the user, when a text attribute is attached to a text, the input unit 101 may be arranged to function as an attribute acquisition unit which acquires the text attribute attached to the text, and the extraction order reading unit 103 may be arranged to read a named entity pattern name corresponding to the text attribute acquired by the input unit 101 and an extraction order total number from the extraction order storage unit 102. The input unit 101 in this case is an example of an attribute acquisition unit, and the contents of the extraction order storage unit 102 are as shown in FIG. 17.

This text attribute may be arranged to indicate not only classifications such as "IT document" or "television program information", but also categories of television programs such as "drama", "news show" and "variety". Since a category of a television program is included in program information constituting an electronic program guide, the input unit 101 can acquire the category from the program information constituting the electronic program guide.

In addition, even when a text attribute is not attached to a text, a text attribute may be estimated by calculating a distance between a word vector generated using words included in the text and a word vector expressing a text attribute, whereby a named entity pattern name corresponding to the text attribute and an extraction order total number may be read from the extraction order storage unit 102. Consequently, the extraction performance of named entity extraction can be improved, and in the case where a text attribute is further attached to an object text of named entity extraction, the user is no longer required to specify a text attribute.

Furthermore, instead of the above-described set ID, a name of a terminal that displays a resulting text that is a text for which named entity extraction has been performed or a terminal identifier capable of identifying a terminal may be used. The contents of the extraction order storage unit 102 in this case are as shown in FIG. 18. Consequently, named entities to be extracted can be set for each terminal that displays a resulting text.

Next, an example that uses the number of previous named entity extractions as an extraction condition will be described with reference to FIGS. 19 to 24.

Figure 19:
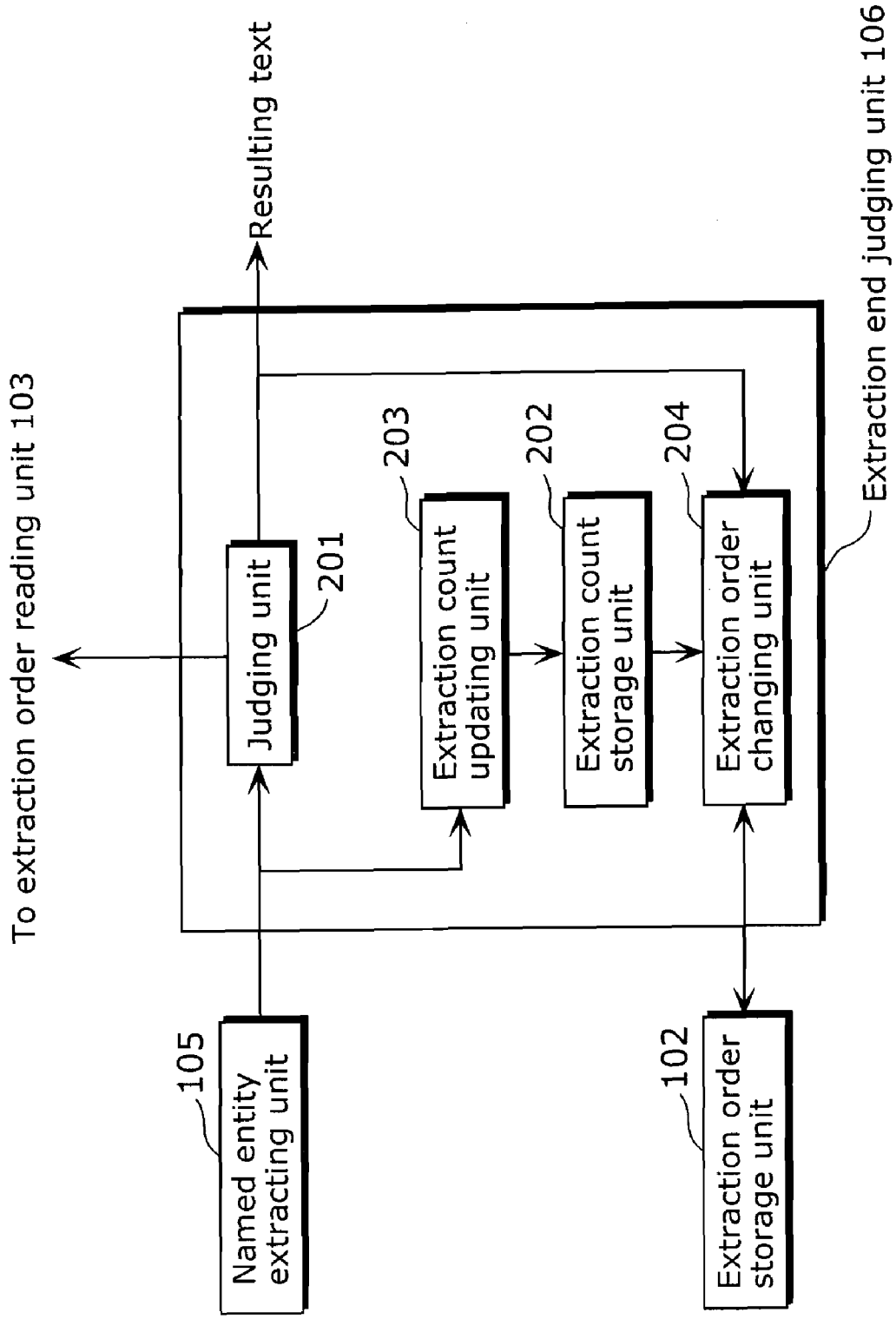
FIG. 19 is a configuration diagram showing an example of an extraction end judging unit used in the named entity extracting apparatus according to the first embodiment.

As shown in FIG. 19, a named entity extracting apparatus in this case is configured so that an extraction order changing unit 204 included in the extraction end judging unit 106 changes the extraction order according to an extraction condition. The extraction order reading unit 103 further outputs a value 1 as an extraction end flag when a named entity pattern name corresponding to the extraction order inputted from the extraction end judging unit 106 cannot be read, and outputs a value 0 as an extraction end flag when a named entity pattern name can be read. The named entity extracting unit 105 further outputs: a value 1 as an extraction flag and an extraction end flag value 1 in the case where the inputted extraction end flag is the value 1 and where a named entity corresponding to the named entity pattern read from the named entity pattern storage unit 104 is extracted; outputs a value 0 as an extraction flag and an extraction end flag value 1 in the case where a named entity is not extracted; and outputs value 0 as an extraction flag and an extraction end flag value 0 without performing any processing in the case where the inputted extraction end flag is the value 0. Furthermore, the extraction end judging unit 106 includes a judging unit 201, an extraction number storage unit 202, an extraction number updating unit 203 and the extraction order changing unit 204. Upon input of an extraction end flag, an extraction order total number, an extraction order and a text from the named entity extracting unit 105, when the extraction end flag is value 0, the judging unit 201 adds a numerical value 1 to the extraction order value and outputs the extraction order after addition and the text inputted from the named entity extracting unit 105 to the extraction order reading unit 103, and further at this point, when the extraction order is equal to the extraction order total number, outputs the text inputted from the named entity extracting unit 105 as a resulting text that is a named entity extraction result, and when the extraction end flag is value 1, outputs the extraction end flag value 1 to the extraction order changing unit 204. In addition, the extraction number storage unit 202 is arranged to store an extraction order that is an order in which named entities are extracted and an extraction number that is the number of extractions of named entities performed according to the extraction order. When an extraction flag, an extraction order total number and an extraction order is inputted from the named entity extracting unit 105, in the case where the inputted extraction flag is value 1, the extraction number updating unit 203 updates the extraction number corresponding to the inputted extraction order and stored in the extraction number storage unit 202. In the case where an extraction end flag of value 1 is inputted from the judging unit 201 and when the total number of the extraction number in the extraction number storage unit 202 is equal to or greater than a given value, the extraction order changing unit 204 may be arranged to change the extraction order in the extraction order storage unit 102 based on the extraction number corresponding to the extraction order stored in the extraction number storage unit 202.

In this case, the extraction number updating unit 203 and the extraction number storage unit 202 are examples of an extraction number counting unit which uses individual named entity patterns to count the number of previous named entity extractions.

Figure 20:
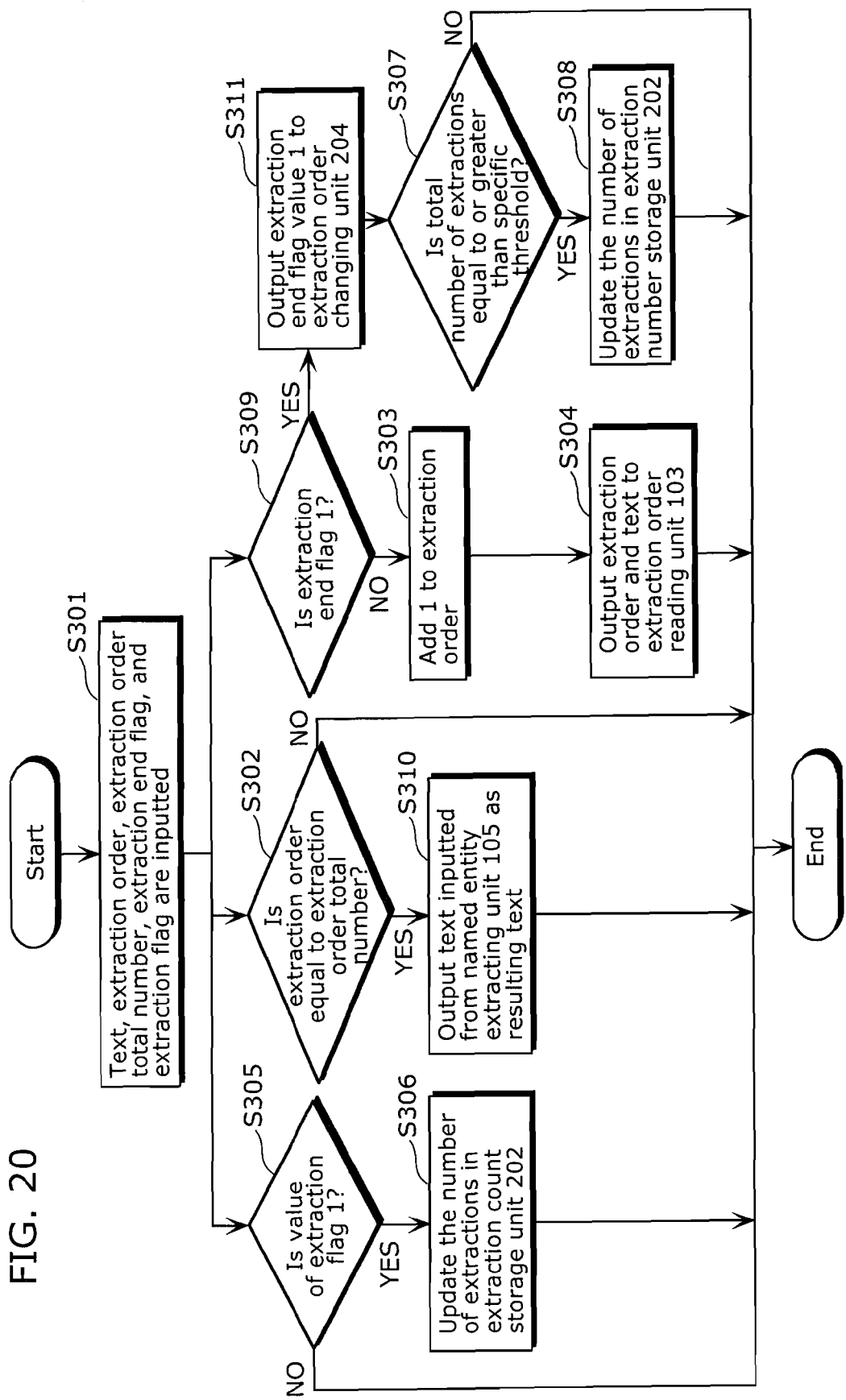
FIG. 20 is a flowchart showing an example of operations according to the first embodiment.

Now, an example of operations will be described with reference to the configuration diagram of the extraction end judging unit 106 shown in FIG. 19 and the flowchart shown in FIG. 20. In the above-described example, when the extraction order total number value 3, the extraction order value 1, the text "<small title>松上電器創業記 (Matsugami denki sougyouki)</small title>(1)-誕生 (Tanjou)-" and the extraction end flag value 0 are inputted from the named entity extracting unit 105 (step S301), since the extraction end flag is value 0 (step S309), the judging unit 201 adds a numerical value 1 to the extraction order value 1 to change the value to 2 (step S303), and outputs the extraction order value 2 and the text "<small title>松上電器創業記 (Matsugami denki sougyouki)</small title>(1)-誕生 (Tanjou)-" to the extraction order reading unit 103 (step S304).

Furthermore, when the extraction order total number value 3, the extraction order value 3, the text "<large title><medium title><small title>松上電器創業記 (Matsugami denki sougyouki)</small title>(1)</medium title>-誕生 (Tanjou)-</large title>" and the extraction end flag value 0 are inputted from the named entity extracting unit 105, since the extraction order value 3 is equal to the extraction order total number value 3 (step S302), the judging unit 201 outputs the input text "<large title><medium title><small title>松上電器創業記 (Matsugami denki sougyouki)</small title>(1)</medium title>-誕生 (Tanjou)-</large title>" as a resulting text that is a named entity extraction result (step S310), and since the extraction end flag is value 0 (step S309), the judging unit 201 adds a numerical value 1 to the extraction order value 3 to change the value to 4 (step S303), and outputs the extraction order value 4 and the text "<large title><medium title><small title>松上電器創業記 (Matsugami denki sougyouki)</small title>(1)</medium title>-誕生 (Tanjou)-</large title>" to the extraction order reading unit 103 (step S304).

In addition, in the case where an extraction order of value 5 is inputted from the extraction end judging unit 106, when it is assumed that the extraction order reading unit 103 is unable to read a named entity pattern name corresponding to the extraction order value 5, the extraction order reading unit 103 outputs the extraction end flag value 1, the extraction order total number value 3, the extraction order value 5 and the text "<large title><medium title><small title>松上電器創業記 (Matsugami denki sougyouki)</small title>(1)</medium title>誕生 (Tanjou)-</large title>" to the named entity extracting unit 105. Subsequently, when the extraction order total number value 3, the extraction order value 5, the text "<large title><medium title><small title>松上電器創業記 (Matsugami denki sougyouki)</small title>(1)</medium title>-誕生 (Tanjou)-</large title>" and the extraction end flag value 1 are inputted from the named entity extracting unit 105 (step S301), since the extraction end flag is value 1 (step S309), the judging unit 201 outputs the extraction end flag value 1 to the extraction order changing unit 204 (step S311). In addition, the extraction number storage unit 202 stores an extraction order that is an order in which named entities are extracted and an extraction number that is the number of extractions of named entities performed in this order.

FIG. 21 is a diagram showing examples of extraction orders and extraction numbers corresponding to the extraction orders stored in the extraction number storage unit 202. ((1,9), (2,6), (3,3), (4,1)) are stored as (extraction order, extraction number). In other words, it is assumed that this suggests that the small title has been extracted 9 times, the middle title has been extracted 6 times, the large title has been extracted 3 times, and the full title has been extracted once. In the example described above, when the text, the extraction flag value 1, the extraction order total number value 3, the extraction order value 1 and the extraction end flag value 0 are inputted from the named entity extracting unit 105 (step S301), since the inputted extraction flag is value 1 (step S305), the extraction number updating unit 203 adds 1 to the extraction number value 9 corresponding to the extraction order value 1 and stored in the extraction number storage unit 202 to change the value to 10 (step S306). In subsequent processing, since named entities are also extracted with respect to the middle title and the large title in a similar manner, the respective extraction number values 6 and 3 corresponding to the extraction order value 2 and 3 and stored in the extraction number storage unit 202 are updated to values 7 and 4.

FIG. 22 shows contents of the extraction number storage unit 202 after updating by the extraction number updating unit 203. When an extraction end flag value 1 is inputted from the judging unit 201, since the total number of the extraction numbers in the extraction number storage unit 202 becomes equal to or greater than a specific value (for example, value 20) (step S307), the extraction order changing unit 204 assumes that the extraction order value 2 corresponding to an extraction number that corresponds to an extraction order stored in the extraction number storage unit 202 that is equal to or greater than a specific value (for example, value 5) is the extraction order total number of the extraction order storage unit 102 (step S308).

FIG. 23 shows contents of the extraction order storage unit 102 after changing by the extraction order changing unit 204. This allows the extraction order total number to be changed using a history of extractions of named entities from an input text of the user and named entities to be extracted with respect to a search result text searched from the information database using the changed extraction order total number. As a result, since named entities to be extracted from a search result text can be arranged to match the same format as a named entity having a high frequency of input by the user, it will be possible to avoid extracting named entities that are redundant to the user or to automatically extract named entities that are required for text identification by the user. In addition, as in the example described above, in the case where the extraction order storage unit 102 organizes an extraction order total number, an extraction order and a named entity pattern name in association with the extraction order as a set, retains a plurality of these sets and performs management by attaching a user identifier or a set ID to each set, the extraction number storage unit 202 may also be arranged to be associated by managing an extraction order and an extraction number as a set for each user identifier or set ID.

FIG. 24 shows contents of the extraction order storage unit 102 in the case where an extraction order and an extraction number are managed as a set for each user identifier.

In addition, while the extraction end judging unit 106 is arranged to judge continuance of named entity extraction processing by an extraction order total number and an extraction order, judgment may be arranged to be performed based on the number of characters that make up an extracted named entity. As a concrete example, the named entity extracting unit 105 may be arranged to output the number of characters that make up an extracted named entity to the extraction end judging unit 106 in addition to the operations in the example described above. When an extraction order, the number of characters that make up an extracted named entity and a text is inputted from the named entity extracting unit 105, in the case where the number of characters that make up the named entity is smaller than a specified number of characters, the extraction end judging unit 106 is arranged to add a numerical value 1 to the extraction order value and to output the extraction order after addition and the text inputted from the named entity extracting unit 105 to the extraction order reading unit 103, and in the case where the number of characters that make up the named entity is equal to or greater than the specified number of characters, the text inputted from the named entity extracting unit 105 is outputted as a resulting text that is a named entity extraction result.

In this case, the extraction end judging unit 106 is an example of an extraction termination unit which terminates, in the case where a named entity whose length exceeds a predetermined threshold is extracted, subsequent extractions using the named entity pattern.

In the above-described example, when the extraction order value 1, the text "<small title> 松上電器創業記 (Matsugami denki sougyouki)</small title>(1)-誕生 (Tanjou)-" from which a named entity is extracted, and the number of kana-kanji characters 7 that make up the extracted named entity " 松上電器創業記 (Matsugami denki sougyouki)" are inputted from the named entity extracting unit 105, since the number of kana-kanji characters 7 that make up the named entity is smaller than a specific number of characters (in this case, for example, 8 is used as the number of characters), the extraction end judging unit 106 changes the extraction order value to 2, and outputs the extraction order value 2 and the text "<small title> 松上電器創業記 (Matsugami denki sougyouki)</small title>(1)-誕生 (Tanjou)-" to the extraction order reading unit 103. Subsequently, when the extraction order value 2, the text "<medium title><small title> 松上電器創業記 (Matsugami denki sougyouki)</small title>(1)</medium title>-誕生 (Tanjou)-" from which a named entity is extracted, and the number of numerical-kanji characters 9 that make up the extracted named entity " 松上電器創業記 (Matsugami denki sougyouki)(1)" are inputted from the named entity extracting unit 105, since the number of kana-kanji characters 9 of the named entity is greater than the specific number of characters 8, the extraction end judging unit 106 further outputs the text "<medium title><small title> 松上電器創業記 (Matsugami denki sougyouki)</small title>(1)</medium title>-誕生 (Tanjou)-" as a resulting text. Consequently, in cases where an upper limit is provided for the number of characters displayable on the display unit and the like, by setting the number of displayable characters as the threshold number of characters of the extraction end judging unit 106, extraction of named entities that are not displayable may be avoided and the amount of processing for named entity extraction may be reduced.

In addition, the named entity extracting apparatus according to the example described above may be arranged to further include a changing unit which allows the user to change the extraction order total numbers, the extraction orders and the named entity pattern names stored in the extraction order storage unit 102. Consequently, the user can change a named entity to be extracted.

As described above, according to the present embodiment, by setting an order in which named entities are extracted, it is possible to extract only named entities necessary for a user, an application or a terminal. In addition, with a speech recognition apparatus that considers named entities extracted from a named entity extracting apparatus to be a target vocabulary of speech recognition, since the number of named entities to be targeted for speech recognition can be reduced, the recognition performance of speech recognition can be improved. Furthermore, with a search apparatus that stores named entities extracted from a named entity extracting apparatus as search target keywords together with search target data in a search target database, since the number of search target keywords can be reduced, search accuracy can be improved.

Second Embodiment

Next, a named entity extracting apparatus according to a second embodiment of the present invention will be described with reference to the drawings.

Figure 27:
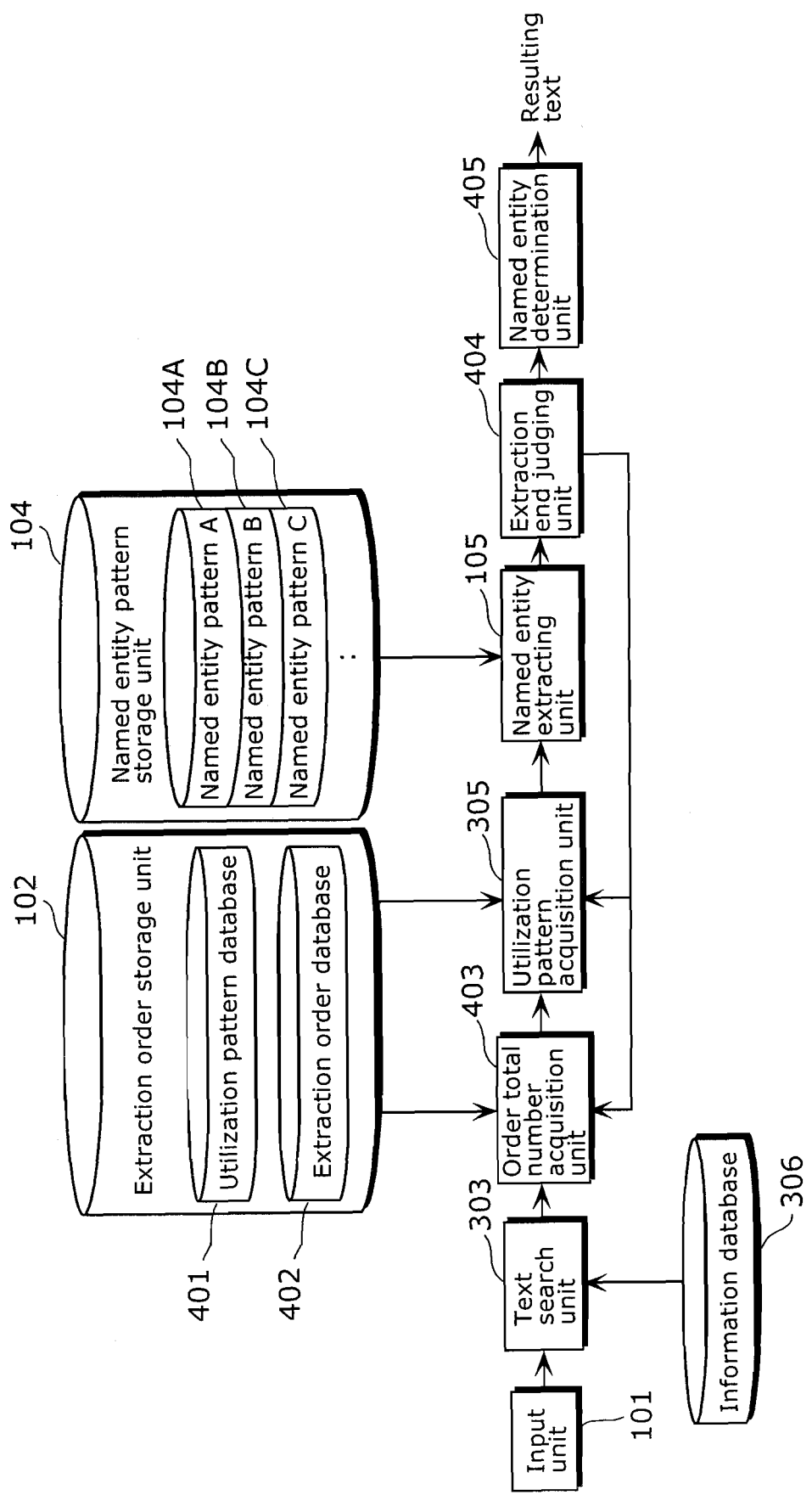
FIG. 27 is a configuration diagram showing a configuration of a named entity extracting apparatus according to a second embodiment of the present invention.

FIG. 27 is a configuration diagram showing a configuration of a named entity extracting apparatus according to the second embodiment of the present invention. Here, it is assumed that components having the same reference numbers as the first embodiment perform the same operations, and a detailed description thereof is omitted. The entity extracting apparatus according to the present embodiment is an apparatus for extracting a minimum named entity necessary for the user to identity texts in the case where a same character string is included in search result texts, and as shown in FIG. 27, is configured to include an input unit 101, an extraction order storage unit 102, a named entity pattern storage unit 104, a named entity extracting unit 105, a text search unit 303, a utilization pattern acquisition unit 305, an information database 306, a utilization pattern database 401, an extraction order database 402, an order total number acquisition unit 403, an extraction end judging unit 404 and a named entity determination unit 405.

Figure 28:
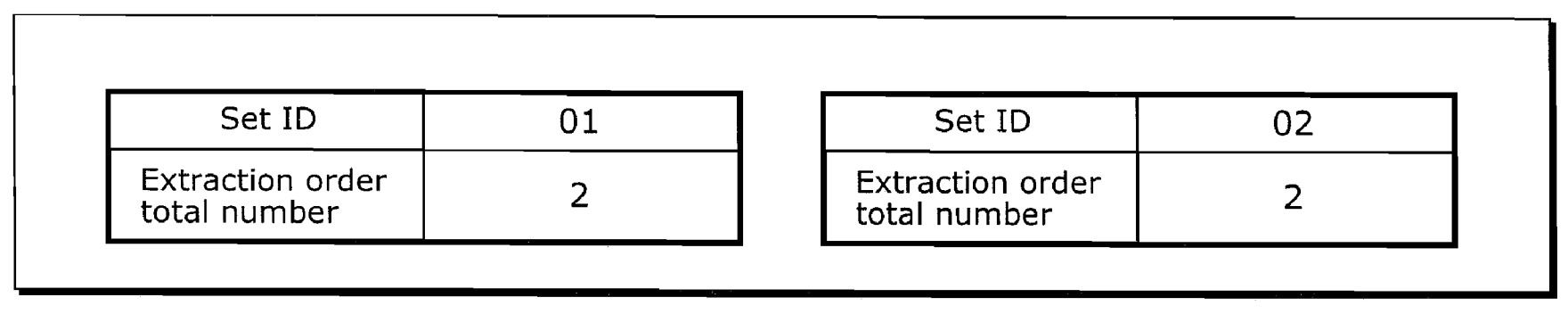

The utilization pattern database 401 and the extraction order database 402 are associated by set IDs that are common IDs. The utilization pattern database 401 stores an extraction order and a named entity pattern name corresponding to the extraction order for each set ID, and the extraction order database 402 stores an extraction order total number for each set ID. FIG. 15 shows an example of the utilization pattern database 401, and FIG. 28 shows an example of contents of the extraction order database 402.

In the case where an search result text and an extraction order is inputted from the text search unit 303, the order total number acquisition unit 403 acquires the lowest set ID, an extraction order total number corresponding to the set ID and a set ID maximum value from the extraction order database 402, and outputs the search result text, the extraction order, the set ID, the extraction order total number and the set ID maximum value to the utilization pattern acquisition unit 305.

Then, in the case where an extraction order, a set ID, an extraction order total number and a set ID maximum value are inputted from the extraction end judging unit 404, the extraction order is reset to 1, 1 is added to the inputted set ID, an extraction order total number corresponding to the set ID after addition is acquired from the extraction order database, and the search result text, the extraction order, the set ID, the extraction order total number and the set ID maximum value are outputted to the utilization pattern acquisition unit 305.

When a text, an extraction order, a set ID, an extraction order total number and a set ID maximum value are inputted from the named entity extracting unit 105, the extraction end judging unit 404 adds 1 to the extraction order. In the case where the extraction order after addition is greater than the extraction order total number, the extraction end judging unit 404 outputs the set ID, the set ID maximum value and the text to the named entity determination unit 405. In the case where the set ID is smaller than the set ID maximum value, the extraction end judging unit 404 outputs the extraction order, the extraction order total number, the set ID and the set ID maximum value to the order total number acquisition unit 403. Additionally, in the case where the extraction order after addition is equal to or smaller than the extraction order total number, the extraction end judging unit 404 outputs the text, the extraction order, the set ID, the extraction order total number and the set ID maximum value to the utilization pattern acquisition unit 305.

When a set ID, a set ID maximum value and a text are inputted from the extraction end judging unit 404, the named entity determination unit 405 stores named entities extracted from a plurality of texts simultaneously inputted in association with the set ID, and when the set ID is equal to the set ID maximum value, the named entity determination unit 405 counts the number of named entities that are similar to the named entity stored in association with each set ID and outputs a named entity corresponding to the set ID having the smallest counted number of similar named entities as a resulting text.

Figure 29:
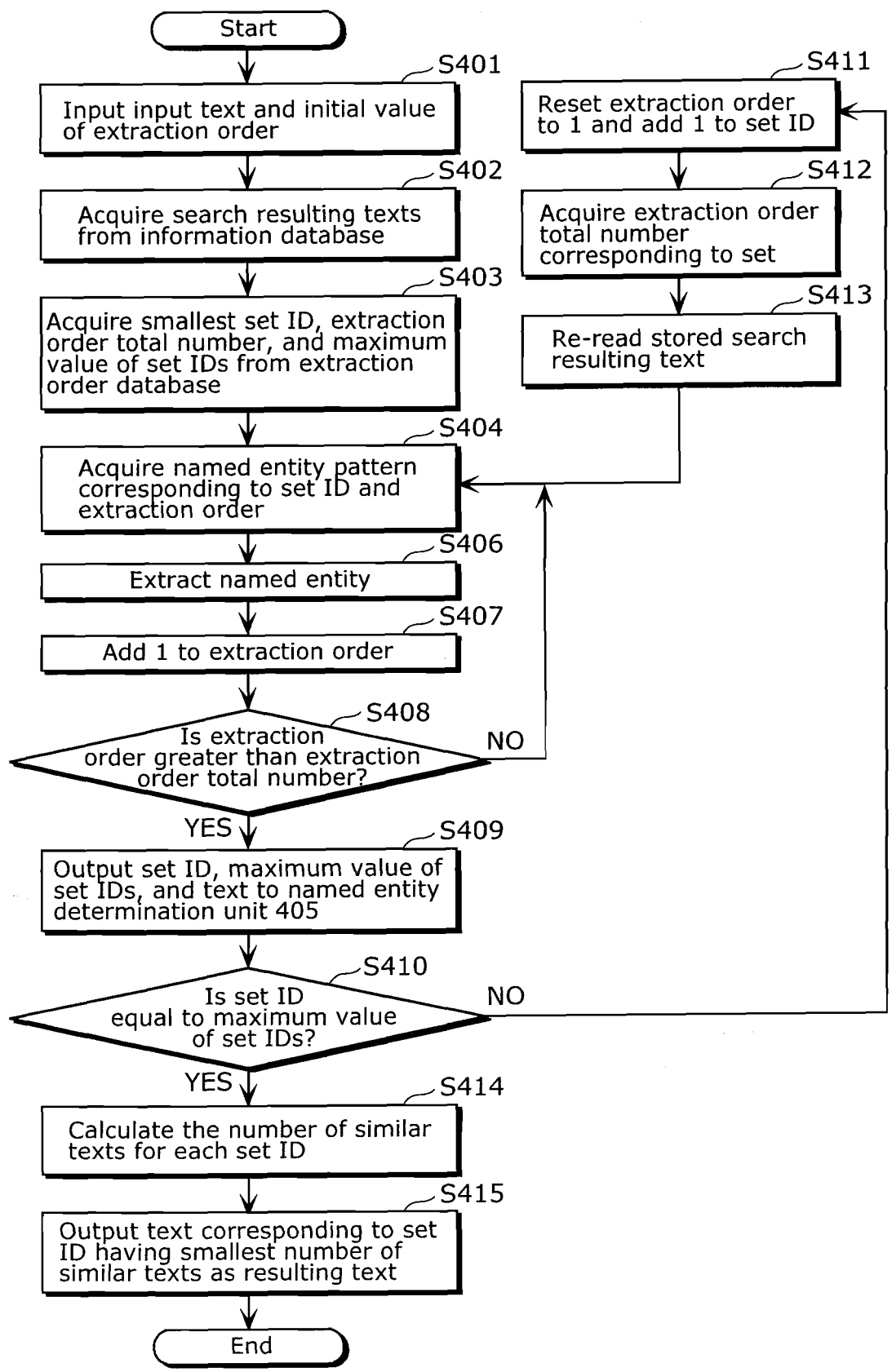
FIG. 29 is a flowchart showing an example of operations according to the second embodiment.

An example of operations when extracting a named entity by the named entity extracting apparatus according to the present embodiment and configured as described above will be described. FIG. 29 is a flowchart showing a flow of an example of operations when extracting a named entity.

When it is assumed that information included in the information database 306 is electronic program information and when a genre "documentary" and an initial value of an extraction order 1 is inputted from the input unit 101 (step S401), the text search unit 303 acquires texts "ドキュメンタリ -(Dokyumentari) (1)- 松上電器の誕生 (Matsugami denki no tanjou)-", "ドキュメンタリ (Dokyumentari)(2)- 松上電器の発展 (Matsugami denki no hatten)-", "人間ドキュメント (Ningen dokyumento) 松下太郎の足跡 (Matsushita Taro no sokuseki)(1)", and "人間ドキュメント (Ningen dokyumento) 松下太郎の足跡 (Matsushita Taro no sokuseki)(2)" of program names corresponding to the genre "documentary" from the information database 306 (step S402), and outputs the search result texts "ドキュメンタリ -(Dokyumentari) (1)- 松上電器の誕生 (Matsugami denki no tanjou)-", "ドキュメンタリ -(Dokyumentari)(2)- 松上電器の発展 (Matsugami denki no hatten)-", "人間ドキュメント (Ningen dokyumento) 松下太郎の足跡 (Matsushita Taro no sokuseki)(1)", "人間ドキュメント (Ningen dokyumento) 松下太郎の足跡 (Matsushita Taro no sokuseki)(2)" and the extraction order 1 to the order total number acquisition unit 403.

When the search result texts "ドキュメンタリ -(Dokyumentari) (1)- 松上電器の誕生 (Matsugami denki no tanjou)-", "ドキュメンタリ (Dokyumentari)(2)- 松上電器の発展 (Matsugami denki no hatten)-", "人間ドキュメント (Ningen dokyumento) 松下太郎の足跡 (Matsushita Taro no sokuseki)(1)", "人間ドキュメント (Ningen dokyumento) 松下太郎の足跡 (Matsushita Taro no sokuseki)(2)" and the extraction order 1 are inputted from the text search unit 303, the order total number acquisition unit 403 acquires a lowest set ID of value 1, an extraction order total number of value 2 corresponding to the set ID and a set ID maximum value 2 from the extraction order database 402 shown in FIG. 28 (step S403), and outputs the texts "ドキュメンタリ -(Dokyumentari) (1)- 松上電器の誕生 (Matsugami denki no tanjou)-", "ドキュメンタリ (Dokyumentari)(2)- 松上電器の発展 (Matsugami denki no hatten)-", "人間ドキュメント (Ningen dokyumento) 松下太郎の足跡 (Matsushita Taro no sokuseki)(1)", "人間ドキュメント (Ningen dokyumento) 松下太郎の足跡 (Matsushita Taro no sokuseki)(2)", the extraction order 1, the set ID value 1, the extraction order total number value 2 and the set ID maximum value 2 to the utilization pattern acquisition unit 305.

In the same manner as in the first embodiment, when the texts, the extraction order total number value, the extraction order, the set ID and the set ID maximum value are inputted from the order total number acquisition unit 403, the utilization pattern acquisition unit 305 acquires a named entity pattern name "named entity pattern A" corresponding to the set ID value 1 and the extraction order 1 inputted from the utilization pattern database 401 shown in FIG. 15 (step S404), and outputs this named entity pattern name "named entity pattern A", the input texts, the extraction order total number value, the extraction order, the set ID, the set ID maximum value and the texts "ドキュメンタリ -(Dokyumentari) (1)- 松上電器の誕生 (Matsugami denki no tanjou)-", "ドキュメンタリ -(Dokyumentari)(2)- 松上電器の発展 (Matsugami denki no hatten)-", "人間ドキュメント (Ningen dokyumento) 松下太郎の足跡 (Matsushita Taro no sokuseki)(1)", "人間ドキュメント (Ningen dokyumento) 松下太郎の足跡 (Matsushita Taro no sokuseki)(2)" to the named entity extracting unit 105.

In the same manner as in the first embodiment, the named entity extracting unit 105 uses the inputted named entity pattern "named entity pattern A" to extract texts "ドキュメンタリ -(Dokyumentari)", "ドキュメンタリ -(Dokyumentari)", "人間ドキュメント (Ningen dokyumento)" and "人間ドキュメント (Ningen dokyumento)" that are named entities of small titles from the texts "ドキュメンタリ -(Dokyumentari)(1)- 松上電器の誕生 (Matsugami denki no tanjou)-,", "ドキュメンタリ -(Dokyumentari)(2)- 松上電器の発展 (Matsugami denki no hatten)-", "人間ドキュメント (Ningen dokyumento) 松下太郎の足跡 (Matsushita Taro no sokuseki)(1)" and "人間ドキュメント (Ningen dokyumento) 松下太郎の足跡 (Matsushita Taro no sokuseki)(2)" (step S406), and outputs texts "<small title>ドキュメンタリ -(Dokyumentari)</small title>(1)- 松上電器の誕生 (Matsugami denki no tanjou)-", "<small title>ドキュメンタリ -(Dokyumentari)</small title>(2)- 松上電器の発展 (Matsugami denki no hatten)-", "<small title>人間ドキュメント (Ningen dokyumento)</small title> 松下太郎の足跡 (Matsushita Taro no sokuseki)(1)" and "<small title>人間ドキュメント (Ningen dokyumento)</small title> 松下太郎の足跡 (Matsushita Taro no sokuseki)(2)" from which named entities have been extracted, the extraction order total number value, the extraction order, the set ID and the set ID maximum value to the extraction end judging unit 404.

The extraction end judging unit 404 adds 1 to the inputted extraction order value to change the value to 2 (step S407), and since the extraction order value 2 after addition is equal to or smaller than the extraction order total number 2 (step S408), outputs the inputted texts "<small title>ドキュメンタリ -(Dokyumentari)</small title>(1)- 松上電器の誕生 (Matsugami denki no tanjou)-", "<small title>ドキュメンタリ -(Dokyumentari)</small title>(2)- 松上電器の発展 (Matsugami denki no hatten)-", "<small title>人間ドキュメント (Ningen dokyumento)</small title> 松下太郎の足跡 (Matsushita Taro no sokuseki)(1)", "<small title>人間ドキュメント (Ningen dokyumento)</small title> 松下太郎の足跡 (Matsushita Taro no sokuseki)(2)", the extraction order total number 2, the extraction order 2, the set ID value 1 and the set ID maximum value 2 to the utilization pattern acquisition unit 305.

Subsequently, in the same manner as described above, the utilization pattern acquisition unit 305 acquires a named entity pattern name "named entity pattern B", and as a result of the extraction of named entities from the texts by the named entity extracting unit 105 using the named entity pattern "named entity pattern B", the named entity extracting unit 105 outputs texts "<middle title><small title>ドキュメンタリ (Dokyumentari)</small title>(1)</middle title>- 松上電器の誕生 (Matsugami denki no tanjou)-", "<middle title><small title>ドキュメンタリ -(Dokyumentari)</small title>(2)</middle title>- 松上電器の発展 (Matsugami denki no hatten)-", "<small title>人間ドキュメント (Ningen dokyumento)</small title> 松下太郎の足跡 (Matsushita Taro no sokuseki)(1)", "<small title>人間ドキュメント (Ningen dokyumento)</small title> 松下太郎の足跡 (Matsushita Taro no sokuseki)(2)", the extraction order total number 2, the extraction order value 2, the set ID value 1 and the set ID maximum value 2 to the extraction end judging unit 404.

The extraction end judging unit 404 adds 1 to the inputted extraction order value to change the value to 3 (step S407), and since the extraction order value 3 after addition is greater than the extraction order total number 2 (step S408), outputs the set ID value 1, the set ID maximum value 2 and the texts "<middle title><small title>ドキュメンタリ -(Dokyumentari)</small title>(1)</middle title>- 松上電器の誕生 (Matsugami denki no tanjou)-", "<middle title><small title>ドキュメンタリ (Dokyumentari)</small title>(2)</middle title> 松上電器の発展 (Matsugami denki no hatten)-", "<small>人間ドキュメント (Ningen dokyumento)</small title> 松下太郎の足跡 (Matsushita Taro no sokuseki)(1)", "<small title>人間ドキュメント (Ningen dokyumento)</small title> 松下太郎の足跡 (Matsushita Taro no sokuseki)(2)" to the named entity determination unit 405 (step S409), and since the set ID value 1 is smaller than the set ID maximum value 2 (step S410), outputs the extraction order value 3, extraction order total number 2, the set ID value 1 and the set ID maximum value 2 to the order total number acquisition unit 403.

In the case where the extraction order value 3, the set ID value 1, the extraction order total number 2 and the set ID maximum value 2 are inputted from the extraction end judging unit 404, the order total number acquisition unit 403 resets the extraction order value to 1, adds 1 to the inputted set ID value to change the value to 2, acquires the extraction order total number 2 corresponding to the set ID value 2 after addition from the extraction order database 402, and outputs the search result texts "ドキュメンタリ -(Dokyumentari)(1)- 松上電器の誕生 (Matsugami denki no tanjou)-", "ドキュメンタリ (Dokyumentari)(2)- 松上電器の発展 (Matsugami denki no hatten)-", "人間ドキュメント (Ningen dokyumento) 松下太郎の足跡 (Matsushita Taro no sokuseki)(1)", "人間ドキュメント (Ningen dokyumento) 松下太郎の足跡 (Matsushita Taro no sokuseki)(2)", the extraction order value 1, the set ID value 2, the extraction order total number 2 and the set ID maximum value 2 to the utilization pattern acquisition unit 305.

Subsequently, in the same manner as described above, the utilization pattern acquisition unit 305 acquires a named entity pattern name "named entity pattern I", and as a result of the extraction of named entities from the texts by the named entity extracting unit 105 using the named entity pattern "named entity pattern I" (as an example, it is assumed that the use of the named entity pattern I results in extraction of portions corresponding to subtitles as small titles), the named entity extracting unit 105 outputs texts "ドキュメンタリ -(Dokyumentari)(1)-<small title> 松上電器の誕生 (Matsugami denki no tanjou)</small title>-", "ドキュメンタリ -(Dokyumentari)(2)-<small title> 松上電器の発展 (Matsugami denki no hatten)</small title>-", "人間ドキュメント (Ningen dokyumento)<small title> 松下太郎の足跡 (Matsushita Taro no sokuseki)</small title>(1)", "人間ドキュメント (Ningen dokyumento) <small title> 松下太郎の足跡 (Matsushita Taro no sokuseki)</small title>(2)", the extraction order total number 2, the extraction order value 1, the set ID value 2 and the set ID maximum value 2 to the extraction end judging unit 404, and the extraction end judging unit 404 changes the extraction order value to 2 and outputs the extraction order value 2, the extraction order total number 2, the set ID value 2 and the set ID maximum value 2 to the utilization pattern acquisition unit 305.

Subsequently, also in the same manner as described above, the utilization pattern acquisition unit 305 acquires a named entity pattern name "named entity pattern J", and as a result of the extraction of named entities from the text by the named entity extracting unit 105 using the named entity pattern "named entity pattern J" (as an example, it is assumed that the use of the named entity pattern J results in the combined extraction of a subtitle and a sequence number following the subtitle as a middle title), the named entity extracting unit 105 outputs texts "人間ドキュメント -(Dokyumentari)(1)-<small title> 松上電器の誕生 (Matsugami denki no tanjou)</small title>-", "ドキュメンタリ -(Dokyumentari)(2)-<small title> 松上電器の発展 (Matsugami denki no hatten)</small title>-", "人間ドキュメント (Ningen dokyumento) <middle title><small title> 松下太郎の足跡 (Matsushita Taro no sokuseki)</small title>(1)</middle title>", "人間ドキュメント (Ningen dokyumento)<middle title><small title> 松下太郎の足跡 (Matsushita Taro no sokuseki)</small title>(2)</middle title>", the extraction order total number 2, the extraction order value 2, the set ID value 2 and the set ID maximum value 2 to the extraction end judging unit 404.

As a result of performing the same operations as described above, since the extraction order value 3 is greater than the extraction order total number (step S408), the extraction end judging unit 404 outputs the set ID value 2, the set ID maximum value 2 and the texts "ドキュメンタリ -(Dokyumentari)(1)-<small title> 松上電器の誕生 (Matsugami denki no tanjou)</small title>-", "ドキュメンタリ -(Dokyumentari)(2)-<small title>松上電器の発展 (Matsugami denki no hatten)</small title>-", "人間ドキュメント (Ningen dokyumento)<small title> 松下太郎の足跡 (Matsushita Taro no sokuseki)</small title>(1)", "人間ドキュメント (Ningen dokyumento)<small title> 松下太郎の足跡 (Matsushita Taro no sokuseki)</small title>(2)" to the named entity determination unit 405.

When the set ID value 1, the set ID maximum value 2 and the texts "<middle title><small title>ドキュメンタリ -(Dokyumentari)</small title>(1)</middle title>- 松上電器の誕生 (Matsugami denki no tanjou)-", "<middle title><small title>ドキュメンタリ -(Dokyumentari)</small title>(2)</middle title>- 松上電器の発展 (Matsugami denki no hatten)-", "<small title>人間ドキュメント (Ningen dokyumento)</small title> 松下太郎の足跡 (Matsushita Taro no sokuseki)(1)", "<small title>人間ドキュメント (Ningen dokyumento)</small title> 松下太郎の足跡 (Matsushita Taro no sokuseki)(2)" are inputted from the extraction end judging unit 404, the named entity determination unit 405 stores the named entities "ドキュメンタリ -(Dokyumentari)(1)", "ドキュメンタリ -(Dokyumentari)(2)", "人間ドキュメント (Ningen dokyumento)" and "人間ドキュメント (Ningen dokyumento)" extracted from a plurality of texts simultaneously inputted in association with the set ID value 1.

Furthermore, when the set ID value 2, the set ID maximum value 2 and the texts "ドキュメンタリ -(Dokyumentari)(1)-<small title> 松上電器の誕生 (Matsugami denki no tanjou)</small title>-", "ドキュメンタリ -(Dokyumentari)(2)-<small title>松上電器の発展 (Matsugami denki no hatten)</small title>-", "人間ドキュメント (Ningen dokyumento)<middle title><small title> 松下太郎の足跡 (Matsushita Taro no sokuseki)</small title>(1)</middle title>", "人間ドキュメント (Ningen dokyumento)<middle title><small title> 松下太郎の足跡 (Matsushita Taro no sokuseki)</small title>(2)</middle title>" are inputted from the extraction end judging unit 404, named entities "松上電器の誕生 (Matsushita denki no tanjou)", "松上電器の発展 (Matsushita denki no hatten)", "松下太郎の足跡 (Matsushita Taro no sokuseki)(1)" and "松下太郎の足跡 (Matsushita Taro no sokuseki)(2)" extracted from a plurality of texts simultaneously no inputted in association with the set ID value 2 are stored.

In addition, at this point, since the set ID value 2 is equal to the set ID maximum value 2 (step S410), the named entity determination unit 405 assumes that the number of similar named entities with respect to the set ID value 1 is 2 since the named entities "人間ドキュメント (Ningen dokyumento)" and "人間ドキュメント (Ningen dokyumento)" are the same (in this case, while only the same texts are assumed to be similar texts, texts sharing a certain number of same characters or more may be considered similar texts), and assumes that the number of similar named entities with respect to the set ID value 2 is 0 since all the named entities are different.

Then, the named entities "松上電器の誕生 (Matsushita denki no tanjou)", "松上電器の発展 (Matsushita denki no hatten)", "松下太郎の足跡 (Matsushita Taro no sokuseki)(1)" and "松下太郎の足跡 (Matsushita Taro no sokuseki)(2)" corresponding to the set ID value 2 having the smallest number of similar named entities are outputted as resulting texts.

In addition, in the example described above, the named entity determination unit 405 uses extracted name entities without modification to count the number of similar named entities. However, in consideration of the fact that a text is generally displayed on a display unit whose size is finite, in the case where the number of display characters that are displayable per named entity on the display unit is known, only texts corresponding to the number of display characters may be extracted from the heads of named entities and the number of similar named entities may be counted with respect to the extracted texts.

As a concrete example, the case where (1, (松下電器 産業の誕生 (Matsushita denki sangyou no tanjou), 松下電器産業の発 松下電器産業の (Matsushita denki sangyou no hatten), 株価推移 展 (Matsushita denki sangyou no kabuka suii), 松下電器産業の発 新製品紹 介 -(Matsushita denki sangyou no shin seihin syoukai))), (2, 松下ド キュメンタリ -(Matsushita dokyumentari), 松下ド キュメンタリ -(Matsushita dokyumentari), 経済ニュース (Keizai nyuusu), 流行の商 (Ryukou no syouhin syoukai))) are inputted as (set ID, named entity group) will now be considered.

This example indicates an example of named entities extracted from program names included in program information. It is assumed that these named entities are displayed on the same display unit by separately using a detailed display format in which the number of characters used per named entity differs and a display format having enhanced list characteristics.

Assuming that the number of characters that make up one named entity in the detailed display format is, for example, 12 characters, the named entity determination unit 405 extracts texts made up of maximum 12 kana-kanii characters (1, 松下電器 産業の誕生 (Matsushita denki sangyou no tanjou), 松下電器産業の発 展 (Matsushita denki sangyou no hatten), 松下電器産業の発 株価推移 介 (Matsushita denki sangyou no kabuka suii), 松下電器産業の発 新製品紹 松下ド -(Matsushita denki sangyou no shin seihin syoukai))), (2, キュメンタリ -(Matsushita dokyumentari), 松下ド キュメンタリ -(Matsushita dokyumentari), 経済ニュース (Keizai nyuusu), 流行の商 (Ryukou no syouhin syoukai))) taken from the heads of the respective named entities. In this case, all of the characters in each name entity are extracted. Then, the number of similar named entities with respect to the set ID values 1 and 2 are respectively counted as 0 and 2, and the named entities "松下電器 産業の誕生 (Matsushita denki sangyou no tanjou)", "松下電器産業の発 発展 (Matsushita denki sangyou no hatten)", "松下電器産業の 松下電器産業の (Matsushita denki sangyou no kabuka suii)" and "株価推 新製品紹介 (Matsushita denki sangyou no shin seihin syoukai)" corresponding to the set ID value 1 having the smallest number of similar named entities are outputted as resulting texts to the display unit.

FIG. 30A is an example of a detailed display format. In this example, program information corresponding to three channels is displayed on a single screen using specific information made up of maximum 12 kana-kanji characters extracted from the program names. This format is suitable for users who desire to study program information in greater detail.

In addition, assuming that the number of characters that make up one named entity in the display format having enhanced list characteristics is, for example, 6 characters, the named entity determination unit 405 extracts texts made up of maximum 6 kana-kanji characters (1, (松下電器産業 (Matsushita denki sangyou), 松下電器産業 (Matsushita denki sangyou), 松下電器産業 (Matsushita denki sangyou), 松下電器産業 (Matsushita denki sangyou))), (2, (松下ドキュメ (Matsushita dokyume), 松下ドキュメ (Matsushita dokyume), 経済ニュース (Keizai nyuusu), 流行の商 (Ryuukou no syouhin syou))) taken from the heads of the respective named entities. Then, the number of similar named entities with respect to the set ID values 1 and 2 are respectively counted as 4 and 2, and the named entities " 松下電器産業 (Matsushita dokyume)", " 松下電器産業 (Matsushita dokyume)", " 経済ニュース (Keizai nyuusu)" and " 流行の商 (Ryuukou no syouhin syou)" corresponding to the set ID value 2 having the smallest number of similar named entities are outputted as resulting texts.

FIG. 30B is an example of a display format having enhanced list characteristics. In this example, program information corresponding to six channels is displayed on a single screen using specific information made Lip of maximum 6 characters extracted from the program names. This format is suitable for users who desire to take a wider view of program information. Note that, as shown, for specific information originally made up of 7 characters or more, the sixth character may be replaced with a predetermined character (for example, ". . . ") to clearly indicate that successive characters are omitted.

As seen, in the case of separately using a plurality of different display formats, named entities that are respectively most effective for the user to identify programs may be displayed as shown in FIGS. 30A and 30B.

As described above, according to the present embodiment, by using, from a plurality of named entity groups extracted from the same text by changing named entity extraction methods, named entities of a named entity group in which the differences among the named entities is the greatest as final results, the number of named entities identifiable by the user can be increased.

Third Embodiment

Next, a named entity extracting apparatus according to a third embodiment of the present invention will be described with reference to the drawings.

FIG. 31 is a configuration diagram showing a configuration of a named entity extracting apparatus according to the third embodiment of the present invention. Here, it is assumed that components having the same reference numbers as the first embodiment perform the same operations, and a detailed description thereof is omitted. The named entity extracting apparatus according to the present embodiment is an apparatus that is able to eliminate duplication in the case where the same named entity exists among displayed named entities, and when the user specifies a displayed named entity, to display named entities that include the specified named entity as a nesting. As shown in FIG. 31, the named entity extracting apparatus is configured to include an input unit 101, an extraction order storage unit 102, an extraction order reading unit 103, a named entity pattern storage unit 104, a named entity extracting unit 105, a named entity storage unit 501, an extraction end judging unit 502, a display condition acquisition unit 503, a named entity acquisition unit 504, a duplication eliminating unit 505 and a display unit 506.

The named entity storage unit 501 associates and stores an input text, a named entity extracted from the input text and an extraction order. An example of the contents of the named entity storage unit 501 is shown in FIG. 32.

When an extraction order total number, an extraction order and texts are inputted from the named entity extracting unit 105, the extraction end judging unit 502 associates and stores the extraction order, the texts and named entities extracted from the texts in the named entity storage unit 501, and further, in the case where the extraction order is smaller than the extraction order total number, adds a numerical value 1 to the value of the extraction order and outputs the extraction order after addition and the texts inputted from the named entity extracting unit 105 to the extraction order reading unit 103.

The display unit 506 displays named entities. The display condition acquisition unit 503 inputs an extraction order of named entities displayed on the display unit 506 or a named entity specified by the user from the plurality of displayed named entities.

In the case where only an extraction order is inputted from the display condition acquisition unit 503, the named entity acquisition unit 504 acquires named entities corresponding to the inputted extraction order from the named entity storage unit 501, and in the case where an extraction order and a named entity specified by the user are inputted from the display condition acquisition unit 503, the named entity acquisition unit 504 searches texts corresponding to the inputted extraction order and named entity from texts stored in the named entity storage unit 501 and with respect to the named entities in the searched texts, acquires named entities corresponding to the extraction order subsequent to the inputted extraction order.

The duplication eliminating unit 505 removes duplications from the named entities acquired by the named entity acquisition unit 504 for display on the display unit 506.

Figure 33:
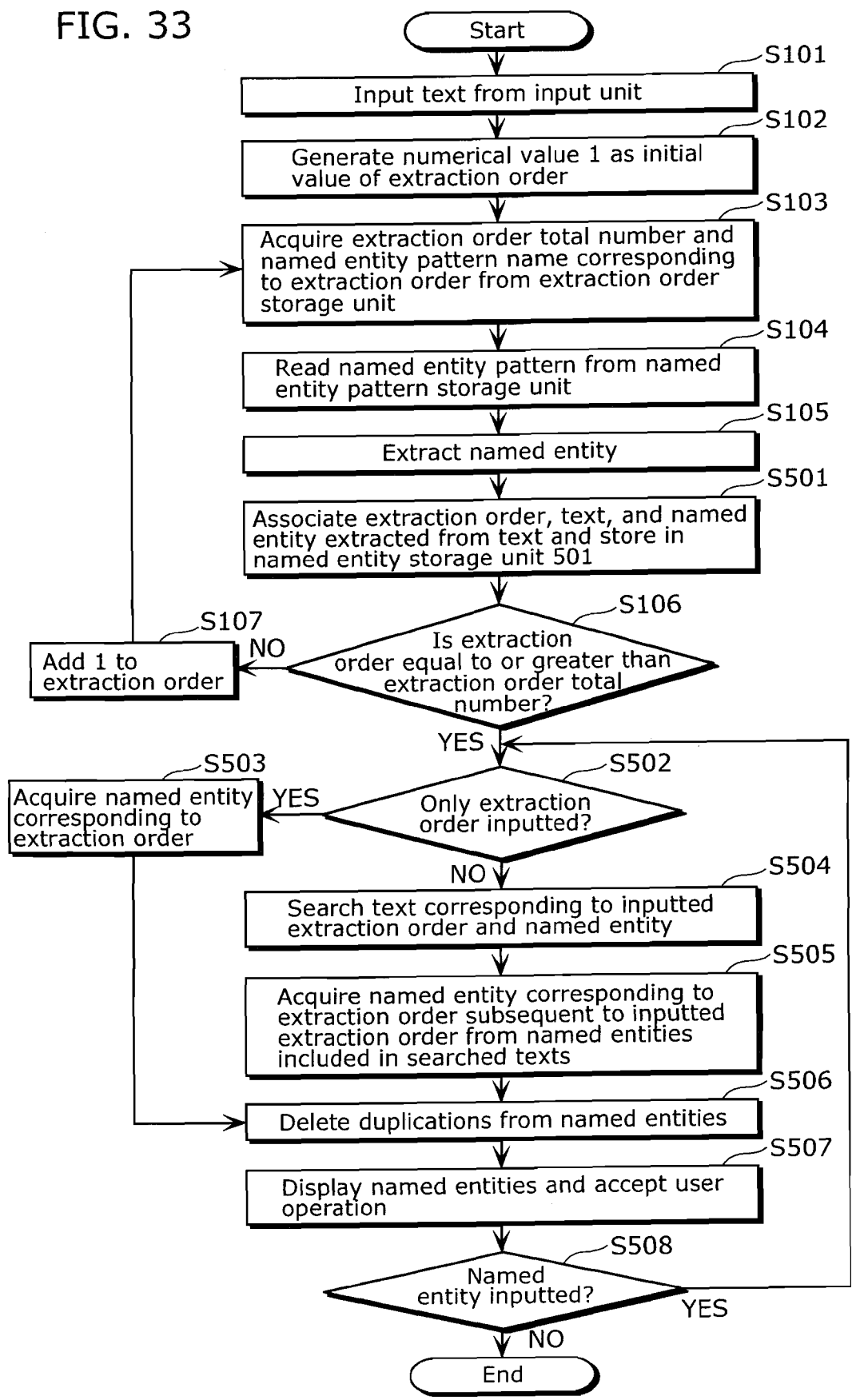
FIG. 33 is a flowchart showing an example of operations according to the third embodiment.

An example of operations when extracting a named entity and displaying the same on the display unit with the named entity extracting apparatus according to the present embodiment and configured as described above will be described. FIG. 33 is a flowchart showing a flow of an example of operations when extracting and displaying a named entity.

Since the same operations as in the first embodiment are performed using the input unit 101, the extraction order storage unit 102, the extraction order reading unit 103, the named entity pattern storage unit 104 and the named entity extracting unit 105 in the operations for extracting a named entity from an input text (step S101 to step S105), a description thereof is omitted.

In the case where an extraction order total number 3, an extraction order 1, texts "<small title>ドキュメンタリ -(Dokyumentari)</small title>(1)- 松上電器の誕生 (Matsugami denki no tanjou)-", "<small title>ドキュメンタリ -(Dokyumentari)</small title>(2)- 松上電器の発展 (Matsugami denki no hatten)-", "<small title>人間ドキュメント (Ningen dokyumento)</small title> 松下太郎の足跡 (Matsushita Taro no sokuseki)(1)" and "<small title>人間ドキュメント (Ningen dokyumento)</small title> 松下太郎の足跡 (Matsushita Taro no sokuseki)(2)" are inputted from the named entity extracting unit 105, the extraction end judging unit 502 associates and stores the extraction order 1, the texts "ドキュメンタリ -(Dokyumentari)(1)- 松上電器の誕生 (Matsugami denki no tanjou)-", "ドキュメンタリ -(Dokyumentari)(2)- 松上電器の発展 (Matsugami denki no hatten)-", "人間ドキュメント (Ningen dokyumento) 松下太郎の足跡 (Matsushita Taro no sokuseki)(1)", "(Ningen dokyumento)人間ドキュメント 松下太郎の足跡 (Matsushita Taro no sokuseki)(2)", and named entities "ドキュメンタリ (Dokyumentari)", "ドキュメンタリ -(Dokyumentari)", "人間ドキュメント (Ningen dokyumento)", "人間ドキュメント (Ningen dokyumento)" extracted from the texts to the named entity storage unit 501 (step S501), and since the extraction order value 1 is smaller than the extraction order total number 3 (step S106), adds a numerical value of 1 to the extraction order value 1 to change the value to 2 (step S107), and outputs the extraction order value 2 after addition and the texts "<small title>ドキュメンタリ -(Dokyumentari)</small title>(1)- 松上電器の誕生 (Matsugami denki no tanjou)-", "<small title>ドキュメンタリ -(Dokyumentari)</small title>(2)- 松上電器の発展 (Matsugami denki no hatten)-", "<small title>人間ドキュメント (Ningen dokyumento)</small title> 松下太郎の足跡 (Matsushita Taro no sokuseki)(1)" and "<small title>人間ドキュメント (Ningen dokyumento)</small title> 松下太郎の足跡 (Matsushita Taro no sokuseki)(2)" to the extraction order reading unit 103. It is assumed that the contents of the named entity storage unit 501 after repeating the above-described operations until the extraction order becomes equal to or greater than the extraction order total number are as shown in FIG. 32. Subsequently, using contents obtained in this manner, the following display operations are performed.

First, the display condition acquisition unit 503 inputs a value 1 that is an initial value of an extraction order, to the named entity acquisition unit 504 without accepting a specification from the user.

In the case where only the extraction order of value 1 is inputted from the display condition acquisition unit 503 (step S502), the named entity acquisition unit 504 acquires name entities "ドキュメンタリ -(Dokyumentari)", "ドキュメンタリ -(Dokyumentari)", "(Ningen dokyumento)" and "人間ドキュメント 人間ドキュメント (Ningen dokyumento)" corresponding to the extraction order value 1 from the named entity storage unit 501 (step S503).

Figure 34:
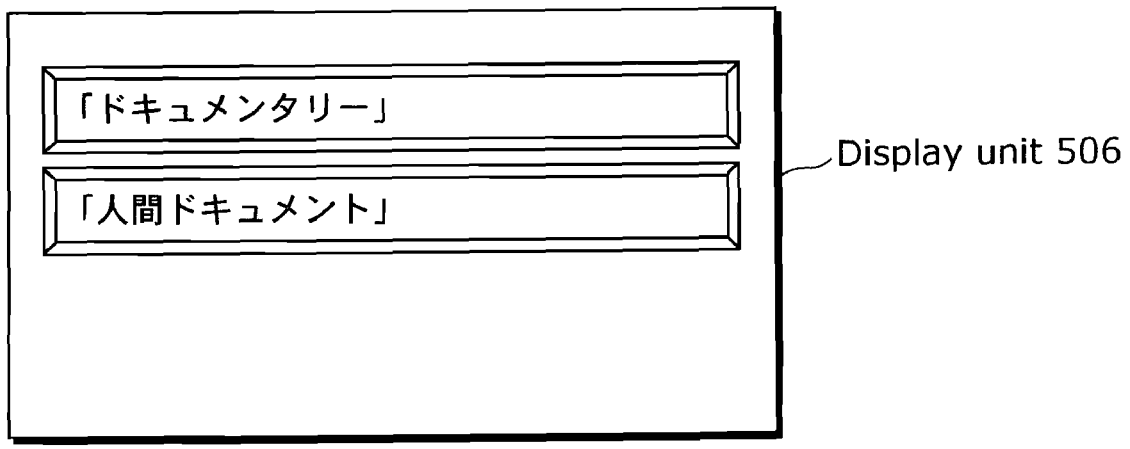
FIG. 34 is a diagram showing a display example of named entities according to the third embodiment.
Figure 35:
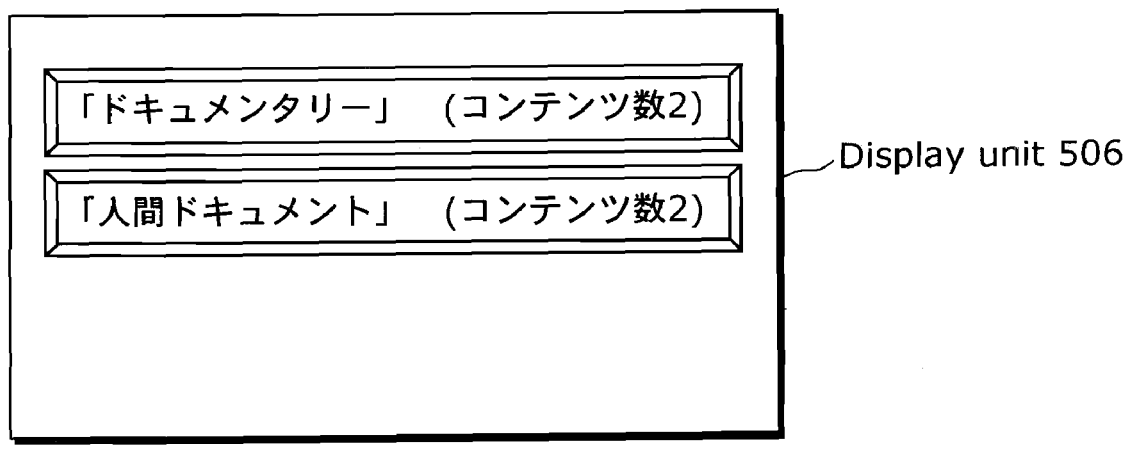
FIG. 35 is a diagram showing a display example of named entities according to the third embodiment.

In the case where the named entities acquired by the named entity acquisition unit 504 are "ドキュメンタリ -(Dokyumentari)", "ドキュメンタリ -(Dokyumentari)", "人間ドキュメント (Ningen dokyumento)" and "人間ドキュメント (Ningen dokyumento)", the duplication eliminating unit 505 removes duplications from these named entities (step S506), and displays the named entities "ドキュメンタリ -(Dokyumentari)" and "人間ドキュメント (Ningen dokyumento)" on the display unit 506 (step S507). An example of display contents displayed on the display unit 506 at this point is shown in FIG. 34. In addition, when displaying the respective named entities, the duplication eliminating unit 505 may concurrently display the number of duplications in the respective named entities. An example of display contents displayed on the display unit 506 at this point is shown in FIG. 35. A user interface function that accepts predetermined operations such as a mouse click operation by the user is attached to each named entity displayed at this point. When a predetermined operation by the user is accepted for one of the displayed named entities, the display condition acquisition unit 503 inputs the named entity on which the operation has been performed and an extraction order of the named entity to the named entity acquisition unit 504.

As an example, when the user clicks "ドキュメンタリ (Dokyumentari)" in FIG. 34, the extraction order value 1 and the named entity "ドキュメンタリ -(Dokyumentari)" specified by the user are inputted from the display condition acquisition unit 503. The named entity acquisition unit 504 searches the texts "ドキュメンタリ -(Dokyumentari)(1)- 松上電器の誕生 (Matsugami denki no tanjou)-" and "ドキュメンタリ -(Dokyumentari)(2)- 松上電器の発展 (Matsugami denki no hatten)-" corresponding to the inputted extraction order value 1 and the named entity "ドキュメンタリ -(Dokyumentari)" from texts stored in the named entity storage unit 501 (step S504), and acquires, from named entities included in the searched texts, named entities "ドキュメンタリ -(Dokyumentari)(1)" and "ドキュメンタリ -(Dokyumentari)(2)" corresponding to the extraction order value 2 that is subsequent to the inputted extraction order (step S505).

Figure 36:
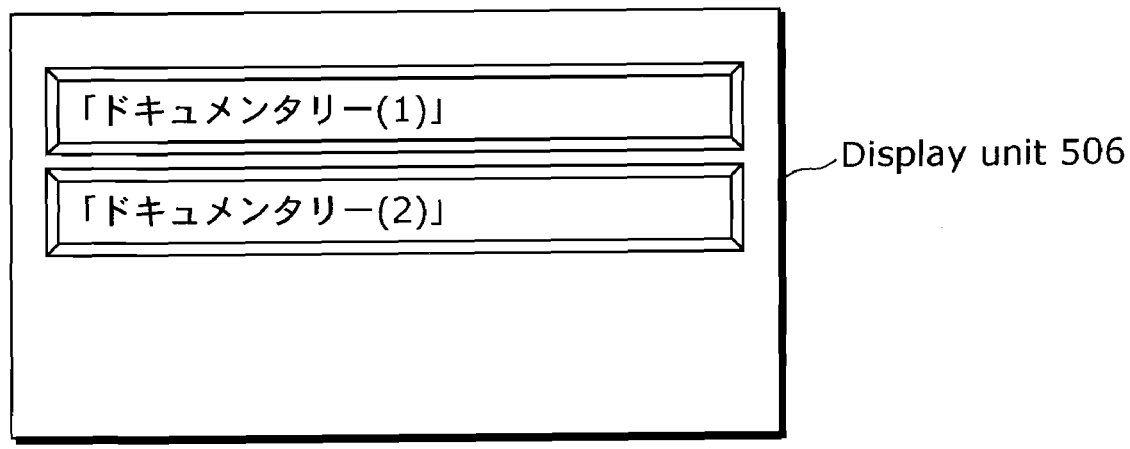
FIG. 36 is a diagram showing a display example of named entities according to the third embodiment.

Then, the named entities "ドキュメンタリ -(Dokyumentari)(1)" and "ドキュメンタリ -(Dokyumentari)(2)" are inputted to the duplication eliminating unit 505. In this case, since there are no duplications in the named entities, the named entities are displayed without modification on the display unit 506. An example of display contents displayed on the display unit 506 at this point is shown in FIG. 36.

As seen, according to the present embodiment, since inputted texts are displayed according to nesting structures of the extracted named entities, the inputted texts can be displayed in a menu hierarchy. In addition, in the case where the input texts are titles of contents or the like stored in a storage device of the user, since a menu hierarchy is generated according to the nesting structures of the extracted named entities, there is no need for the user to find a desired title from a title list in which duplications exist, and the desired title can be found by merely tracing the menu hierarchy.

(Other Variations)

While examples in which the input texts and the extracted named entities are Japanese have been heretofore described, it is needless to say that the input texts and the extracted named entities need not be limited to Japanese. For example, it is obvious that named entities can be extracted from input texts described in Chinese (simplified).

FIGS. 37A and B show examples of program names included in Chinese program information to become input texts. By extracting named entities from the program names in the same manner and presenting the named entities to the user as described above, a named entity extracting apparatus capable of extracting named entities adapted to an extraction condition expressed by an input history of the user, the display performance of a display terminal and the like from Chinese input texts can be achieved.

INDUSTRIAL APPLICABILITY

The present invention is capable of adapting extracted named entities to a user, an application or a terminal to be used by the user when extracting named entities from texts, and is useful in a hard disk recorder, a DVD recorder, a TV, an audio component system, a terminal capable of accessing the Internet to perform an information search, information search servers and the like.

The invention claimed is:

1. A named entity extracting apparatus that extracts a named entity from one or more input texts by sequentially using one or more named entity patterns each indicating a judgment criterion of a named entity portion included in a text, said named entity extracting apparatus comprising:
    a processor;
    an information database which stores a plurality of texts;
    a text acquisition unit configured to acquire the plurality of texts from said information database;
    a named entity pattern storage unit which stores the named entity patterns;
    an extraction order storage unit which stores a plurality of rule sets each representing an association between the one or more named entity patterns and extraction order numbers indicating an order in which the one or more named entity patterns are used for extracting named entities, the one or more named entity patterns being stored by said named entity pattern storage unit;
    a named entity extracting unit configured, for each of the rule sets, to extract one or more portions from the plurality of texts as the named entities in the order indicated by the extraction order numbers each corresponding to the named entity patterns included in each of the rule sets, and to determine the extracted named entities as a named entity set, the one or more portions satisfying a judgment criterion indicated by each of the named entity patterns, the plurality of texts being acquired by said text acquisition unit, and the rule sets being stored by said extraction order storage unit; and
    a named entity determination unit configured to count, using the processor, for each of the named entity sets, the number of similar named entities out of named entities included in each of the named entity sets, and to output a named entity set having the smallest number of the similar named entities, the named entity sets being obtained by said named entity extracting unit, and the similar named entities including a predetermined number or more of identical characters.

2. The named entity extracting apparatus according to claim 1, further comprising:
    a display unit configured to display the texts,
    wherein said named entity determination unit is configured to extract, from the named entities, partial named entities corresponding to the number of characters displayable on said display unit when counting the number of the similar named entities for each of the named entity sets, and to use the number of the similar partial named entities as the number of the similar named entities when the extracted partial named entities are similar to each other.

3. A named entity extracting apparatus that extracts a named entity from one or more input texts by sequentially using one or more named entity patterns each indicating a judgment criterion of a named entity portion included in a text, said named entity extracting apparatus comprising:
    a processor;
    a named entity pattern storage unit which stores the named entity patterns;
    an extraction order storage unit which stores a rule set representing an association between the one or more named entity patterns and extraction order numbers indicating an order in which the one or more named entity patterns are used for extracting named entities, the one or more named entity patterns being stored by said named entity pattern storage unit;
    a named entity extracting unit configured to extract one or more portions from the input texts as the named entities in the order indicated by the extraction order numbers each corresponding to the named entity patterns included in the rule set stored by said extraction order storage unit, the one or more portions satisfying a judgment criterion indicated by each of the named entity patterns;
    a named entity storage unit which stores, in association with each other, the extracted named entities, the input texts from which the named entities are extracted, and the extraction order numbers each corresponding to the named entity patterns;
    a display condition specification unit configured to specify, using the processor, a predetermined extraction order number or to specify one or more named entities extracted in association with a common extraction order number in response to a user operation;
    a named entity acquisition unit configured to acquire, from said named entity storage unit, all the named entities stored in association with the specified extraction order number in the case where said display condition specification unit specifies the predetermined extraction order number, and to acquire, from said named entity storage unit, the named entities stored in association with (i) an extraction order number following the common extraction order number and (ii) the input texts corresponding to each of the specified named entities in the case where said display condition specification unit specifies the one or more named entities;
    a duplication eliminating unit configured to eliminate duplication of the named entities acquired by said named entity acquisition unit; and
    a display unit configured to display the named entities remaining after the duplication has been eliminated by said duplication eliminating unit.

4. A named entity extracting method for extracting a named entity from one or more input texts using one or more named entity patterns each indicating a judgment criterion of a named entity portion included in one of the input texts, and using one or more rule sets each representing an association between the one or more named entity patterns and extraction order numbers indicating an order in which the one or more named entity patterns are used for extracting named entities, said named entity extracting method comprising:
    a text acquisition step of acquiring a plurality of texts;
    a named entity extracting step of, for each of the rule sets, extracting one or more portions from the plurality of texts as the named entities in the order indicated by the extraction order numbers each corresponding to the named entity patterns included in each of the rule sets, and determining the extracted named entities as a named entity set, the one or more portions satisfying a judgment criterion indicated by each of the named entity patterns; and a named entity determination step of counting, using a processor, for each of the named entity sets, the number of similar named entities out of named entities included in each of the named entity sets, and outputting a named entity set having the smallest number of the similar named entities.

5. A named entity extracting method for extracting a named entity from one or more input texts using one or more named entity patterns each indicating a judgment criterion of a named entity portion included in one of the input texts, and using a rule set, each rule set representing an association between the one or more named entity patterns and extraction order numbers indicating an order in which the one or more named entity patterns are used for extracting named entities, said named entity extracting method comprising:

a named entity extracting step of extracting one or more portions from the input texts as the named entities in the order indicated by the extraction order numbers each corresponding to the named entity patterns included in the rule set, the one or more portions satisfying a judgment criterion indicated by each of the named entity patterns;

a named entity storage step of storing, in association with each other, the extracted named entities, the input texts from which the named entities are extracted, and the extraction order numbers each corresponding to the named entity patterns and being used for the extraction;

a display condition specification step of specifying, using a processor, a predetermined extraction order number or specifying one or more named entities extracted in association with a common extraction order number in response to a user operation;

a named entity acquisition step of acquiring all the named entities that are stored in association with the specified extraction order number in the case where the predetermined extraction order number is specified in the display condition specification step, and acquiring the named entities stored in association with (i) an extraction order number following the common extraction order number and (ii) the input texts corresponding to each of the specified named entities in the case where the one or more named entities is specified in the display condition specification step;

a duplication eliminating step of eliminating duplication of the named entities acquired in the named entity acquisition step; and a display step of displaying the named entities remaining after the duplication has been eliminated in said duplication eliminating step.

6. A computer-readable storage medium having a program embodied thereon for extracting a named entity from one or more input texts with reference to a named entity pattern storage unit which stores one or more named entity patterns each indicating a judgment criterion of a named entity portion included in a text and an extraction order storage unit which stores a plurality of rule sets each representing an association between the one or more named entity patterns and extraction order numbers indicating an order in which the one or more named entity patterns are used for extracting named entities, and the one or more named entity patterns being stored by the named entity pattern storage unit, said program causing a computer to execute:

a text acquisition step of acquiring a plurality of texts from an information database;

a named entity extracting step of, for each of the rule sets, extracting one or more portions from the plurality of texts as the named entities in the order indicated by the extraction order numbers each corresponding to the named entity patterns included in each of the rule sets, and determining the extracted named entities as a named entity set, the one or more portions satisfying a judgment criterion indicated by each of the named entity patterns, the plurality of texts being acquired in said text acquisition step, and the rule sets being stored by the extraction order storage unit; and a named entity determination step of counting, for each of the named entity sets, the number of similar named entities out of named entities included in each of the named entity sets, and outputting a named entity set having the smallest number of the similar named entities, the named entity sets being obtained in said named entity extracting step, and the similar named entities including a predetermined number or more of identical characters.

7. A computer-readable storage medium having a program embodied thereon for extracting a named entity from one or more input texts with reference to a named entity pattern storage unit which stores one or more named entity patterns each indicating a judgment criterion of a named entity portion included in a text and an extraction order storage unit which stores a rule set representing an association between the one or more named entity patterns and extraction order numbers indicating an order in which the one or more named entity patterns are used for extracting named entities, the one or more named entity patterns being stored by the named entity pattern storage unit, said program causing a computer to execute:

a named entity extracting step of extracting one or more portions from the input texts as the named entities in the order indicated by the extraction order numbers each corresponding to the named entity patterns included in the rule set stored by the extraction order storage unit, the one or more portions satisfying a judgment criterion indicated by each of the named entity patterns;

a named entity storage step of storing, in association with each other, the extracted named entities, the input texts from which the named entities are extracted, and the extraction order numbers each corresponding to the named entity patterns and being used for the extraction;

a display condition specification step of specifying a predetermined extraction order number or specifying one or more named entities extracted in association with a common extraction order number in response to a user operation;

a named entity acquisition step of acquiring all the named entities that correspond to the specified extraction order number and that are stored in said named entity storage step in the case where the predetermined extraction order number is specified in said display condition specification step, and acquiring the named entities following the common extraction order number and the input texts corresponding to each of the named entities in the case where the one or more named entities is specified in said display condition specification step, the named entities being stored in said named entity storage step and being specified;

a duplication eliminating step of eliminating duplication of the named entities acquired in said named entity acquisition step; and a display step of displaying the named entities remaining after the duplication has been eliminated in said duplication eliminating step.

* * * * *